(12) United States Patent
Togashi

(10) Patent No.: US 7,551,422 B2
(45) Date of Patent: Jun. 23, 2009

(54) MULTILAYER CAPACITOR, MANUFACTURING METHOD THEREOF

(75) Inventor: Masaaki Togashi, Nikaho (JP)

(73) Assignee: TDK Corporation, Tokyo (JP)

( * ) Notice: Subject to any disclaimer, the term of this patent is extended or adjusted under 35 U.S.C. 154(b) by 152 days.

(21) Appl. No.: 11/898,592

(22) Filed: Sep. 13, 2007

(65) Prior Publication Data

US 2008/0080120 A1     Apr. 3, 2008

(30) Foreign Application Priority Data

Sep. 29, 2006   (JP) .............................. 2006-269071

(51) Int. Cl.
*H01G 4/228* (2006.01)
*H01G 4/005* (2006.01)

(52) U.S. Cl. .................... 361/309; 361/303; 361/306.3; 29/25.42

(58) Field of Classification Search ................. 361/303, 361/306.1, 306.3, 309; 29/25.42
See application file for complete search history.

(56) References Cited

U.S. PATENT DOCUMENTS 6,515,842 B1 * 2/2003 Hayworth et al. ........... 361/303
2004/0264105 A1 * 12/2004 Galvagni et al. .......... 361/306.3
2005/0094350 A1 * 5/2005 Kobayashi et al. ........ 361/306.3
2006/0039097 A1 * 2/2006 Satou ......................... 361/303

FOREIGN PATENT DOCUMENTS

| JP | A-09-129476 | 5/1997 |
| JP | A-2000-114096 | 4/2000 |
| JP | A-2003-051423 | 2/2003 |
| JP | A-2006-060147 | 3/2006 |

* cited by examiner

*Primary Examiner*—Eric Thomas
(74) *Attorney, Agent, or Firm*—Oliff & Berridge, PLC

(57) ABSTRACT

A multilayer capacitor having a dielectric body, an internal layer portion, external layer portions a first terminal electrode connected with a first internal conductor layer and a first external conductor layer, formed at least on a first side face of side faces of the dielectric body, and a second terminal electrode connected with a second internal conductor layer and a second external conductor layer, formed on a second side face opposed to the first side face of the dielectric body. The dielectric layer positioned at the external layer portions includes a plurality of pin hole conducting portions connecting a pair of first external conductor layers or a pair of second external conductor layers to each other adjacent to the dielectric layer, in an area of overlapping a pair of the first external conductor layers or a pair of the second external conductor layers adjacent to the dielectric layer.

19 Claims, 12 Drawing Sheets

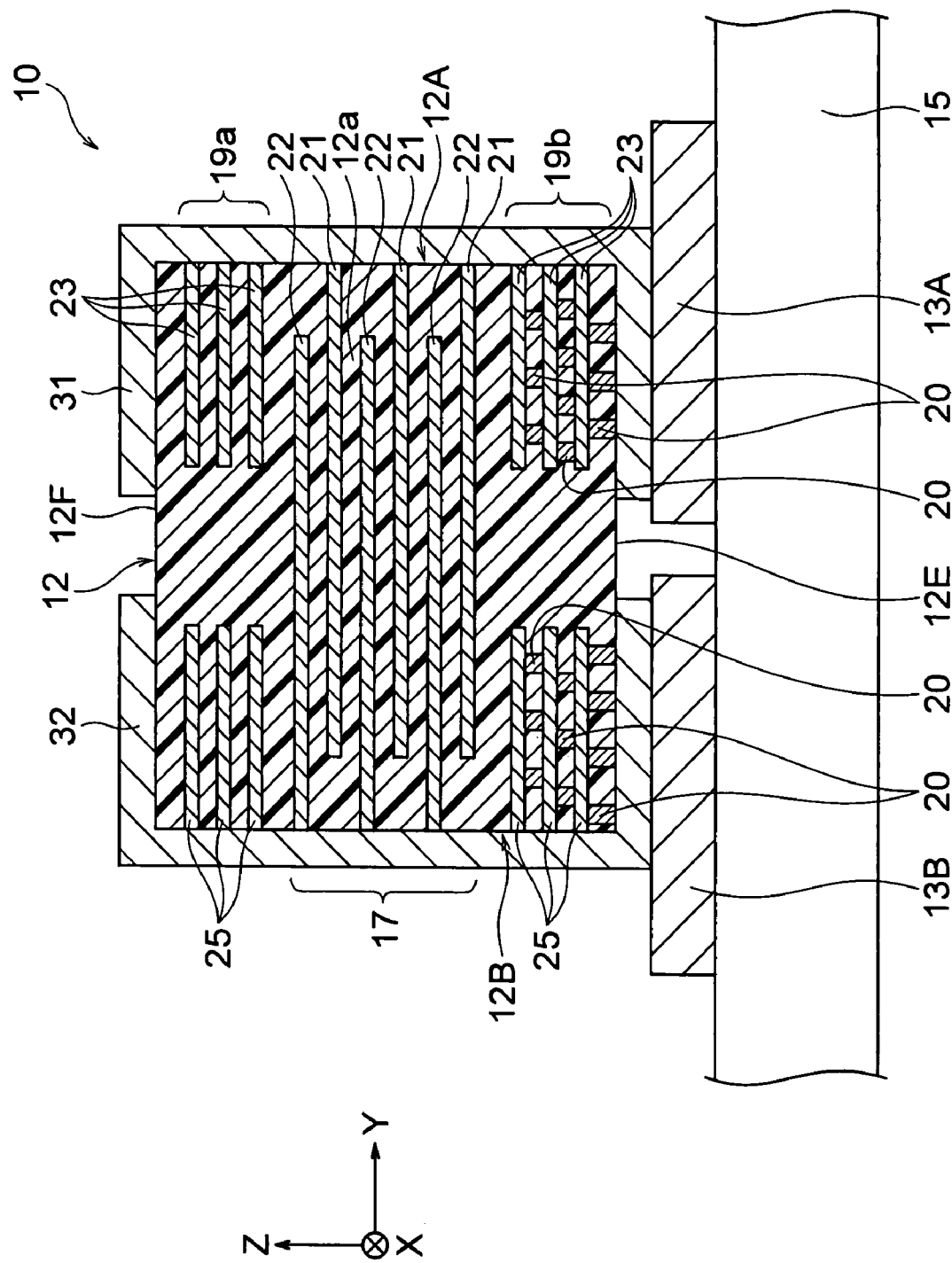

MULTILAYER CAPACITOR, MANUFACTURING METHOD THEREOF

BACKGROUND OF THE INVENTION

1. Field of the Invention

The present invention relates to multilayer capacitor greatly reducing the equivalent serial inductance (ESL) and manufacturing method thereof, more particularly relates to a multilayer capacitor used as a decoupling capacitor and manufacturing method thereof.

2. Description of the Related Art

In recent years, while advances have been made in reducing the voltage of power sources used for supplying power to large-scale integrated circuits (LSI's) and other integrated circuits, the load current has increased.

Therefore, it has become extremely difficult to keep fluctuations in the power source voltage to within tolerances when faced with rapid changes in the load current. Therefore, a decoupling capacitor (for example two-terminal structure multilayer ceramic capacitor) is now being connected to a power source. At the time of transitory fluctuation in the load current, current is supplied from this multilayer ceramic capacitor to the LSI of the central processing unit (CPU) etc. to suppress fluctuation of the power source voltage.

Along with the increasingly higher operating frequencies of today's CPU's, however, the fluctuations in the load current have become faster and larger. The equivalent serial inductance (ESL) of the decoupling capacitor itself now has a great impact on fluctuations of the power source voltage.

That is, since the ESL is high in a conventional multilayer ceramic capacitor, fluctuation of the power source voltage V easily becomes greater in the same way as above along with fluctuations in the load current i.

That is because the fluctuations in voltage at the time of transition of the load current are approximated by the following equation 1 and therefore the level of the ESL is related to the magnitude of fluctuation of the power source voltage. Further, from equation 1, reduction in the ESL can be said to be linked with stabilization of the power source voltage.

$$dV = ESL \cdot di/dt \qquad \text{equation 1}$$

where, dV is transitory fluctuation of voltage (V), i is the fluctuation of current (A), and t is the time of fluctuation (sec).

As a multilayer capacitor wherein the ESL is reduced, a multilayer capacitor shown in Japanese Unexamined Patent Publication No. 2003-51423 is known. According to this multilayer capacitor, parasitic inductance can be reduced. As a result, the ESL can be reduced. However, it has been required to further reducing the ESL.

Further, as a multilayer capacitor wherein the ESL is reduced, a multi-terminal multilayer capacitor is known. In the multi-terminal multilayer capacitor, by increasing external terminal electrode, current flow varying in direction can be realized in an internal conductor layer. As a result, further reducing of the ESL becomes possible.

However, in the multi-terminal capacitor, there are problems that preparing a plurality of internal conductor layer patterns is necessary, and that increasing number of external terminals results in higher manufacturing cost.

A two terminal capacitor is shown in Japanese Unexamined Patent Publication No. 2006-60147. This two terminal capacitor comprises conductor layer of an internal layer portion, a dummy conductor layer sandwiching the internal layer portion in stacking direction. The dummy conductor layers, and the dummy conductor layer and terminal electrode are connected via metallic particles in dielectric layer. However, in the two terminal capacitor of the JP Unexamined Patent Publication No. 2006-60147, the effects of reducing the ESL cannot be obtained sufficiently because the metallic particles are used for preventing peeling of terminal electrodes.

SUMMARY OF INVENTION

An object of the present invention is to provide a multilayer capacitor, not a multi-terminal capacitor, able to greatly reduce the ESL and manufacturing method thereof with low manufacturing cost.

Means for Solving Problem

To attain the above object, there is provided a multilayer capacitor comprising a dielectric body formed by stacking a plurality of dielectric layers having an approximately rectangular parallelepiped shape; an internal layer portion in which a first internal conductor layer and a second internal conductor layer are stacked alternately in said dielectric body via said dielectric layer as mutually overlapping in stacking direction to form an internal electrode circuit of a capacitor; an external layer portion in which pluralities of first external conductor layers and second external conductor layers, which are not overlapping in stacking direction, are stacked in said dielectric body via said dielectric layer, the external layer portions being adjacent to at least any of both end faces of said internal layer portion in stacking direction; a first terminal electrode connected with said first internal conductor layer and said first external conductor layer, formed at least on a first side face of side faces of said dielectric body, the first side face being parallel to stacking direction; and a second terminal electrode connected with said second internal conductor layer and said second external conductor layer, formed at least on a second side face opposed to said first side face of said dielectric body, and said dielectric layer positioned at said external layer portion comprises, in an area of overlapping a pair of said first external conductor layers or a pair of said second external conductor layers adjacent to said dielectric layer, a plurality of pin hole conducting portions connecting a pair of said first external conductor layers or a pair of said second external conductor layers each other adjacent to said dielectric layer, in stacking direction.

According to the multilayer capacitor of the present invention, in an external layer portion, a first external conductor layer and a second external conductor layer are stacked via said dielectric layer which are not overlapping in stacking direction. Thus, in case of electric-potential of the first terminal electrode is higher than that of the second terminal electrode, from the first terminal electrode to the first external conductor layer, the electric current flows separately, and the electric current flows from the second external conductor layer into the second terminal electrode. On the other hand, in case of electric-potential of the second terminal electrode is higher than that of the first terminal electrode, from the second terminal electrode to the second external conductor layer, the electric current flows separately, and the electric current flows from the first external conductor layer into the first terminal electrode. As stated above, in any cases, by making the electric flow separately, which flows from terminal electrode to conductor layer, the ESL of whole multilayer capacitor can be reduced. Additionally, as a result that the external layer portion includes pluralities of first and second external conductor layers respectively, the effect of separately flowing the electric current from each terminal electrode to an external conductor layer can be increased. Namely, pluralities of the first external conductor layer portion and the internal layer conductor layer portion perform as a plurality of inductor components connected in parallel, so that the ESL of whole body of the multilayer capacitor can be reduced.

Also, a dielectric layer positioned at an external layer portion comprises a plurality of pin hole conducting portions which connect a pair of first external conductor portions or a pair of a second external conductor portions each other adjacent to the dielectric layer respectively, in stacking direction. As a result, through the pin hole conductor portions, the electric current can be separated widely in stacking direction between a pair of the first external conductor layers or a pair of second external conductor layers. Further, it is possible to separate the electric current between the whole first external conductor layers or the whole second external conductor layers positioned in an external layer portion. As a result, the ESL of the whole body of the multilayer capacitor can be reduced further.

Also, in the present invention, by connecting the first or the second external conductor layers each other by an infinite number of pin hole conducting portions, the electric current can be flown more separately than in the case of connecting whole external conductor layers each other by through hole conducting portion in stacking direction, and thus, the ESL of the whole body of the multilayer capacitor can be reduced further.

That is, according to the multilayer capacitor of the present invention, a great reduction in the ESL of the multilayer capacitor is achieved, fluctuation of the power source voltage can be suppressed, and it can be suitably used as a decoupling capacitor, etc.

Preferably, a pin hole diameter of said pin hole conducting portion is 1 to 10 µm. Preferably also, said pin hole diameter of said pin hole conducting portion is larger than particle diameter of conducting materials filling into pin holes to form pin hole conducting portions. In addition, a pin hole diameter means a diameter of pin hole conducting portions in a plane direction of a dielectric layer wherein the pin hole conducting portion is formed.

By making a pin hole diameter is within a range of 1 to 10 µm, in forming process of the pin hole conducting portions, it is possible to fill conducting material into the pin hole, sufficiently and precisely. As a result, the pin hole conducting portions penetrate dielectric layer completely. Therefore, a pair of first external conductor layers each other or a pair of second external conductor layers each other adjacent to dielectric layer can be connected electrically, it is possible to spread the current sufficiently. As a result, the ESL of whole multilayer capacitor can be reduced.

Preferably, a total crossing area of said pin hole conducting portions is 30 to 50% to a total area of said first external conductor layer or said second external conductor layer connecting the pin hole conducting portions. Note that, the total crossing area of pin hole conducting portions means total value of an area of a plurality of pin hole conducting portions (area of plane direction vertical to stacking direction) formed on one dielectric layer.

By making a total crossing area of the pin hole conducting portion (current flow channel crossing area) is within the above range, the current is sufficiently separated between first external conductor layers or second external conductor layers, and, thus, the ESL of whole multilayer capacitor can be reduced sufficiently. Also, strength of green sheet forming dielectric layer of external layer portion can be sufficient.

Preferably, a plurality of pin hole conducting portions are randomly arranged in said stacking direction and a vertical plane direction to said stacking direction of said dielectric layer having said plurality of pin hole conducting portions.

By randomly arranging an infinite number of pin hole conducting portions in the dielectric layer, it is possible to make a broad array and to vary directions of the current between external conductor layers. This function and effect cannot be obtained by through hole conducting portion and the like having larger size than that of pin hole conducting portion and limited number of through holes. Also, in the dielectric layer, by randomly arranging an infinite number of pin hole conducting portions, it is possible to increase adhesion strength of the dielectric layer with a first and a second external conductor layers adjacent to the dielectric layer.

Preferably, said first terminal electrode is formed straddling said first side face, a third and a fourth side faces parallel to said stacking direction adjacent to said first side face of side faces of said dielectric body, and said second terminal electrode is formed straddling said second side face, said third and said fourth side faces parallel to said stacking direction adjacent to said second side face of side faces of said dielectric body.

Preferably, said first internal conductor layer comprises a first lead portion led out straddling said first side face, said third and fourth side faces of said dielectric body, connected with said first terminal electrode, and said second internal conductor layer comprises a second lead portion led out straddling said second side face, said third and fourth side faces of said dielectric body, connected with said second terminal electrode.

Preferably, said first external conductor layer comprises a third lead portion led out straddling said first side face, said third and fourth faces, connected with said first terminal electrode, and said second external conductor layer comprises a fourth lead portion led out straddling said second side face, said third and forth side faces, connected with said second terminal electrode.

The first terminal electrode is formed straddling three side faces of a first, a third and a fourth side faces, and the second terminal electrode is formed straddling a second, a third and a fourth side faces. In this way, by connecting each conducting layer to each terminal electrode formed straddling three side faces of dielectric body respectively, a current flow channel crossing area between each terminal electrode and each conductor layer becomes larger. As a result, the ESL of whole multilayer capacitor can be reduced.

Preferably, in case that a width of said third lead portion in vertical direction to said stacking direction of said dielectric layer is W3 in said third and fourth side faces, a width of said fourth lead portion in vertical direction to said stacking direction of said dielectric layer is W4 in said third and fourth side faces, a width of said first terminal electrode in vertical direction to said stacking direction of said dielectric layer is L3 in said third and fourth side faces, and a width of said second terminal electrode in vertical direction to said stacking direction of said dielectric layer is L4 in said third and fourth side faces, W3<L3, and W4<L4.

By making W3<L3, and W4<L4, it is possible to prevent exposure of the first and the second external conductor layers onto the third and the fourth side faces.

Preferably, in case that a width of said third and said fourth side faces in vertical direction to said stacking direction of said dielectric layer is W0, $0.15 \leq W3/W0 \leq 0.45$, and $0.15 \leq W4/W0 < 0.45$.

When the W3/W0 and W4/W0 are too small, the ESL of capacitor cannot be reduced sufficiently because the current separately flowing from each terminal electrode to each external conductor layer becomes smaller. Also, when W3/W0 and W4/W0 are too large, there are possibility that each external conductor layer is exposed on the third or the fourth side faces of a dielectric body 12 and that facing first and second external conducting layers contact each other. Consequently, by making W3/W0 and W4/W0 within the above range in order to prevent these defects, the ESL of capacitor can be reduced.

Preferably, in said first internal conductor layer, a first space pattern, which is not connected with said first terminal electrode, is formed at a position along with said first side face According to a multilayer capacitor of the present invention, a first space pattern is formed against a first lead portion of a first internal conductor layer. Accordingly, the first lead portion comprises a pair of branch lead pattern led out from a main body of the first internal conductor layers to two corner portions wherein a first longitudinal direction side face and a lateral direction side face of the dielectric body are crossing. Consequently, in each first internal conductor layer, the current flows are formed from the respective corner portions of the branch lead pattern to diagonal corner portions, respectively, these flows are crossing in a same plane at a main body of the first internal conductor layer.

As a result, the action canceling out the magnetic field is occurred at current flow crossing position, so that parasitic inductance can be smaller, effect of reducing the equivalent serial inductance is occurred.

Further, by arranging pluralities of the first internal conductor layer having the first space pattern and the two types of the conductor layers of the second internal conductor layer in the dielectric body, not only does the electrostatic rise, but also the action canceling out the magnetic field becomes greater, the inductance is more greatly reduced, and the ESL is reduced further.

In said first external conductor layer, a first external layer space pattern, which is not connected with said first terminal electrode, may be formed at a position along with said first side face. Further, in said second external conductor layer, a second external layer space pattern, which is not connected with said second terminal electrode, may be formed at a position along with said second side face.

Preferably, widths of said first and second side faces in vertical direction to said stacking direction of said dielectric layer is larger than widths of said third and fourth side faces in vertical direction to said stacking direction of said dielectric layer.

Namely, in the present invention, the first terminal electrode and the second terminal electrode are formed in a longitudinal direction (a first and second side faces). Namely, the first terminal electrode and the second terminal electrode are facing each other in a lateral direction (a direction opposing the first and the side faces). As a result, a distance between the terminals (the distance of the first terminal electrode and the second terminal electrode) becomes shorter and the current channels become shorter, so that the ESL is further reduced. Also, even though the first space pattern is formed on the first lead portion in order to form the first terminal electrode and the second terminal electrode along with each longitudinal direction side face of a dielectric body, connecting length between each lead portion and each terminal electrode can be secured sufficiently.

Preferably, said first terminal electrode is formed straddling said first side face, said fifth and/or said sixth side faces adjacent to the first side face and vertical to said stacking direction, said second terminal electrode is formed straddling said second side face, said fifth and/or said sixth side faces adjacent to the second side face and vertical to said stacking direction.

Preferably, in vertical direction to said stacking direction, width of said first terminal electrode at said fifth side face and/or said sixth side face is larger than width of said first external conductor layer, and in vertical direction to said stacking direction, width of said second terminal electrode at said fifth side face and/or said sixth side face is larger than width of said second external conductor layer. Namely, it is preferable that, in a plane direction which is vertical to said stacking direction, a plane area of the first external conductor layer is covered completely by a plane area of the first terminal electrode, and a plane area of the second external conductor layer is covered completely by a plane area of the second terminal electrode.

In the present invention, pin hole conductor portions are formed only in a area of overlapping the first external conductor layer and the second external conductor layer in the dielectric layer. Therefore, in the fifth side face and/or the sixth side faces, by making the width of the first terminal electrode larger than the width of the first external conductor layer, the first external conductor layer and whole pin hole conducting portions connected with the first external conductor layer are covered by the first terminal electrode. Similarly, in the fifth side faces and/or the sixth side faces, by making the width of the second terminal electrode larger than the width of the second external conductor layer, the second external conductor layer and whole pin hole conducing portions connected with the second external conductor layer are covered by the second terminal electrode. As a result, it is possible to prevent exposure of the first external conductor layer, the second external conductor layer and the pin hole conducting portions to the fifth side faces and/or the sixth side faces of the dielectric body. Therefore, it is also possible to prevent contamination by impurities such as moisture and conductive materials during the production process of the multilayer capacitor.

Preferably, said first external conductor layer is connected with said first terminal electrode formed on said fifth side face and/or said sixth side face by a plurality of said pin hole conducting portions of said dielectric layer placed between said first terminal electrode and said first external conductor layer; and said second external conductor layer is connected with said second terminal electrode formed on said fifth side face and/or said sixth side face by a plurality of said pin hole conducting portions of said dielectric layer placed between said second terminal electrode and said second external conductor layer.

By connecting the first terminal electrode and the first external conductor layer by a plurality of pin hole conducting portions, the current can be separated between the first terminal electrode and the first external conductor layer. Similarly, due to connecting the second terminal electrode and the second external conduct layer by a plurality of the pin hole conducting portions, the current can be separated between the second terminal electrode and the second external conducting layer. As a result, the ESL of whole multilayer capacitor can be reduced.

The method for manufacturing multilayer capacitor according to the present invention comprises the steps of:
    forming an internal layer green sheet;
    forming said first internal conductor layer and said second internal conductor layer;
    forming an external layer green sheet having a plurality of pin holes;

forming pluralities of said first external conductor layer and said second external conductor layer;

forming a plurality of said pin hole conducting portions by filling conducting material to a plurality of said pin holes;

forming an external stacking layer portion by stacking a plurality of said first external conductor layer and said second external conductor layer via said external layer green sheet, without overlapping each other in stacking direction;

forming an internal stacking layer portion by stacking said first internal conductor layer and said second internal conductor layer via said internal layer green sheet as mutually overlapping in said stacking direction;

forming a green chip by cutting predetermined dimension of multilayer body having said external stacking layer portion stacked at least any one of both end faces in stacking direction of said internal layer green sheet of said internal layer stacking portion;

forming said dielectric body by firing said green chip; and forming said first terminal electrode and said second terminal electrode on said dielectric body.

Preferably, said pin hole conducting portion is formed simultaneously with forming said first external conductor layer or said second external conductor layer on a surface of said external layer green sheet by stacking. For example, in the case of forming the first external conductor layer or said second external conductor layer on an external layer green sheet surface by printing method, conductive paste for forming these conductor layers enters pin holes of the external layer green sheet, and the pin hole conducing portions are formed simultaneously. Namely, in the method for manufacturing multilayer capacitor according to the present invention, forming the first external conductor layer and the second external conductor layer, and forming the pin hole conducting portions can be operated simultaneously.

Preferably, forming said internal layer portion continuously after forming said external layer portion. Preferably further, forming said external layer portion continuously after forming said internal layer portion. Although a process of multilaying green sheet can be conducted divisionally by respective blocks of an external multilayer portion or an internal multilayer portion, continuously operating without dividing them is preferable.

Note that, in the present invention, the first internal conductor layer and the second internal conductor layer are relative concept and thus, the first internal conductor layer and the second internal conductor layer may be converse. Further, other "a first . . . " and "a second . . . " are similar to this. The first external conductor layer and the second external conductor layer are similar, too.

BRIEF DESCRIPTION OF DRAWINGS

FIG. 2 is a schematic cross sectional view of the multilayer capacitor of FIG. 1.

DESCRIPTION OF THE PREFERRED EMBODIMENTS

First Embodiment (Multilayer Capacitor)

Figure 1:
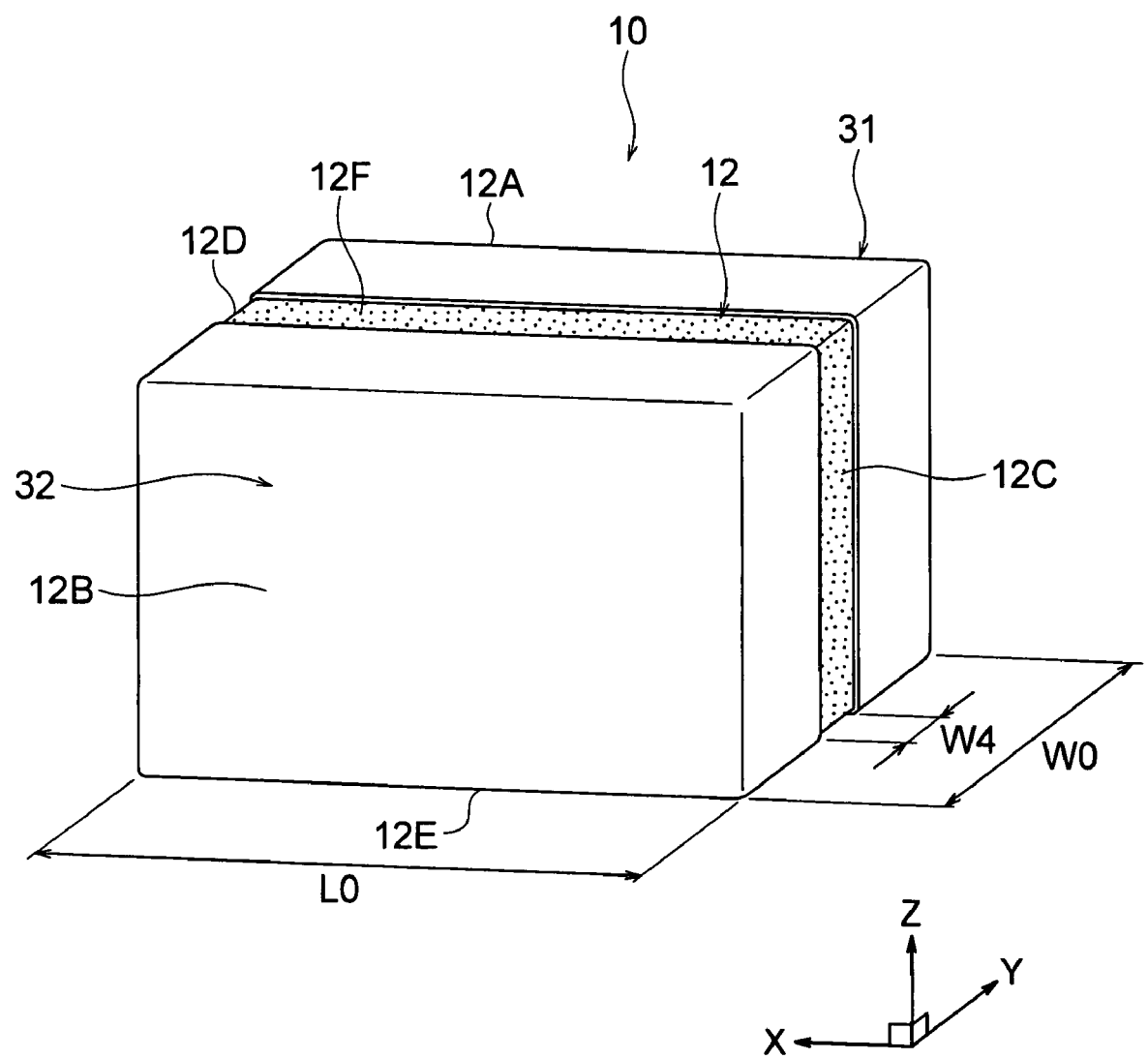
FIG. 1 is a perspective view of a multilayer capacitor in a first embodiment of the present invention.

Whole constitution of a multilayer ceramic capacitor (herein after simply referred to as a "multilayer capacitor) 10 of a first embodiment of the present invention is specified. As shown in FIG. 1, the multilayer capacitor 10 comprises a dielectric body 12, a rectangular parallelepiped shaped sintered body obtained by firing a stack of a plurality of ceramic green sheets as dielectric layers.

The dielectric body 12 comprises a first side face 12A and a second side face 12B opposed to the first side face. Also, the dielectric body 12 comprises a third side face 12C and a fourth side face 12D adjacent to the first side face 12A and the second side face 12B, parallel to stacking direction Z of the dielectric layer and opposed each other.

In the present embodiment, preferably, as shown in FIG. 1, width L0 of the first side face 12A and the second side face 12B in vertical direction to stacking direction Z (X-direction) of the dielectric layer is larger than width W0 of the third side face 12C and the fourth side face 12D in vertical direction to stacking direction Z (Y-direction) of the dielectric layer.

Below, in the explanation of the present embodiment, it is described that the first side face 12A is a first longitudinal direction side face 12A, the second side face 12B is a second longitudinal direction side face 12B, the third side face 12C is a third lateral direction side face 12, and the fourth side face 12D is a fourth lateral direction side face 12D.

On an external surface of the dielectric body 12, a first terminal electrode 31 is formed straddling five side faces of the first longitudinal direction side face 12A, the two lateral direction side faces 12C and 12D, a fifth side face 12E and a sixth side face 12F which are vertical to stacking direction Z. Further, a second terminal electrode 32 is formed straddling 5 five side faces of the second longitudinal direction side face 12B, the two lateral direction side faces 12C and 12D, the fifth side face 12E and the sixth side face 12F of the dielectric body 12.

A pair of terminal electrodes 31 and 32, as being insulated each other, are spaced with width W4 along with Y-direction on the opposed lateral side faces 12C and 12D of the body 12. The width of W4 is preferably 0.3 to 0.5 mm.

The multilayer capacitor 10 of the present embodiment is a two-terminal structure multilayer capacitor wherein the terminal electrodes 31 and 32 are arranged on whole side faces 12A to 12F of the rectangular parallelepiped shaped (hexahedron shaped) dielectric body 12.

FIG. 2 is a sectional view of the multilayer capacitor 10 shown in FIG. 1 wherein the capacitor is cut in parallel to the lateral side faces 12C and 12D. As shown in FIG. 2, the first terminal electrode 31 and the second terminal electrode 32 are connected on a circuit substrate 15 via substrate side electrode terminals 13A and 13B.

The multilayer capacitor 10 comprises an internal layer portion 17, and external layer portions 19a and 19b. The external layers 19a and 19b are positioned as adjacent to both end faces of the internal layer portion 17.

In the internal layer portion 17, a first internal conductor layer 21 and a second internal conductor layer 22 are alternately stacked via a dielectric layer 12a so as to overlap each other in stacking direction Z, to form an internal electrode circuit of a capacitor. In the present embodiment, three each of the first and the second internal conductor layers 21 and 22 are alternately arranged in the dielectric body 12, sandwiched between the dielectric layers 12a. Note that, as the material of these internal conductor layers 21 and 22, not only may base metal materials such as nickel, nickel alloy, copper, or copper alloy be considered, but also materials having these materials as main ingredient may be considered.

In the external layer portions 19a and 19b, pluralities of first external conductor layers 23 and a second external conductor layers 25 are alternately stacked via the dielectric layer 12a without overlapping each other in stacking direction. Note that, as the material of these external conductor layers 23 and 25, the similar materials described previously may be used.

The first internal conductor layer 21 and the first external conductor layer 23 are connected to the first terminal electrode 31. Also, the second internal conductor layer 22 and the second external conductor layer 25 are connected to the second terminal electrode 32.

In the external layer portion 19b positioned at the circuit substrate 15 side, the dielectric layer 12a comprises a plurality of pin hole conducting portions 20 in an area of overlapping a pair of the first external conductor layer 23 and a pair of the second external conductor layer 25 adjacent to the dielectric layer 12b. The pin hole conducting portions 20 electrically connect a pair of the first external conductor layer 23 each other or a pair of the second external conductor layer 25 each other, in stacking direction Z.

Preferably, the first terminal electrode 31 formed on the fifth side face 12E and the first external conductor layer 23 are connected by a plurality of pin hole conducting portions 20 included in the dielectric layer 12a positioned between the first terminal electrode 31 and the first external conductor layer 23. Preferably further, the second terminal electrode 32 formed on the fifth side face 12E and the second external conductor layer 25 are connected by a plurality of pin hole conducting portions included in the dielectric layer 12a positioned between the second terminal electrode 32 and the second external conductor layer 25.

By connecting the first terminal electrode 31 and the first external conductor layer 23 by a plurality of pin hole conducting portions 20, the current can be separated between the first terminal electrode 31 and the first external conductor layer 23. Simultaneously, by connecting the second terminal electrode 32 and the second external conducting layer 25 by a plurality of pin hole conducting portions 20, the current can be separated between the second terminal electrode 32 and the second external conductor layer 25. As a result of this, the ESL of whole multilayer capacitor 10 can be reduced.

Preferably, in both directions X and Y vertical to said stacking direction Z, width of said first terminal electrode 31 at said fifth side face 12E and said sixth side face 12F is larger than width of said first external conductor layer 23. Namely, in directions of XY planes, it is preferable that a plane area of the first external conductor layer 23 is completely covered by a plane area of the first terminal electrode 31.

Preferably, in both directions X and Y vertical to said stacking direction Z, width of said second terminal electrode 32 at said fifth side face 12E and said sixth side face 12F is larger than width of said second external conductor layer 25. Namely, in directions of XY planes, it is preferable that a plane area of the second external conductor layer 25 is covered by a plane area of the second terminal electrode 32, completely.

At an external layer portion 19b, the pin hole conducting portions 20 are formed only at an overlapping area of the first external conductor layer 23 and the second external conductor layer 25 in the dielectric layer 12a. Therefore, in the fifth side face 12E, by making the width of the first terminal electrode 31 larger than the width of the first external conducting layer 23, the first external conductor layer 23 and whole pin hole conducting portions 20 connected to the first external conductor layer 23 are covered by the first terminal electrode 31. Similarly, in the fifth side face 12E, by making the width of the second terminal electrode 32 larger than the width of the second external conductor layer 25, the second external conductor layer 25 and whole pin hole conducting portions 20 connected to the second external conductor layer 25 are covered by the second terminal electrode 32. As a result, it is possible to prevent exposure of the first external conductor layer 23, the second external conductor layer 25 and the pin hole conducting portions 20 at the fifth side face 12E and the sixth side face 12F of the dielectric body 12. Accordingly, in a manufacturing process of the multilayer capacitor 10, it is possible to prevent contamination by impurities such as moisture and conductive materials, from the pin hole conducting portions 20 to the inside of capacitor.

Figure 3A:
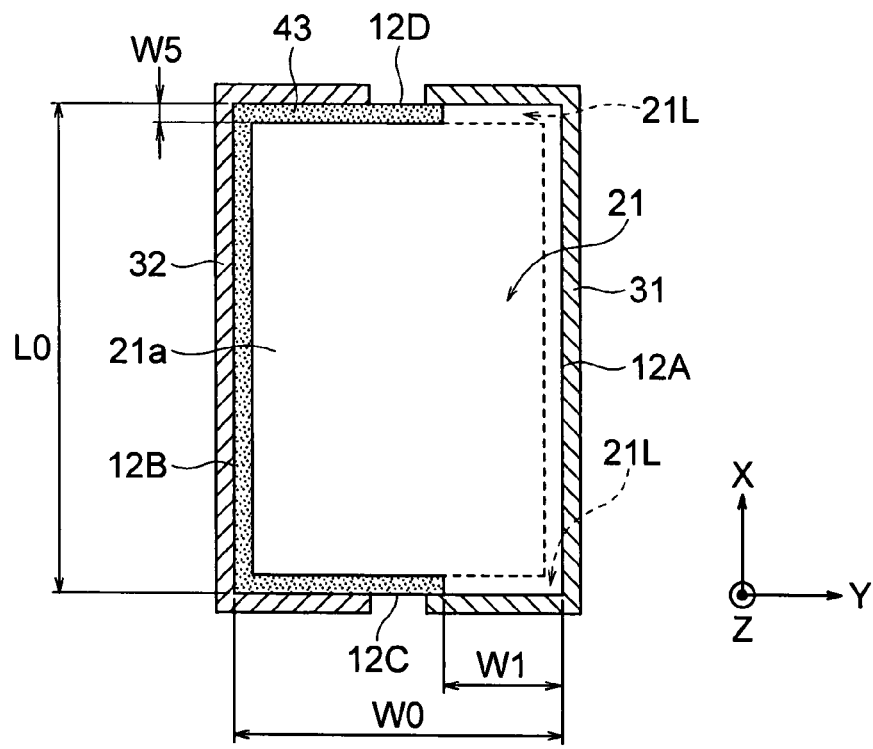
FIGS. 3A and FIG. 3B are plane views of a first internal conductor layer and a second internal conductor layer shown in FIG. 2, respectively.
Figure 3B:
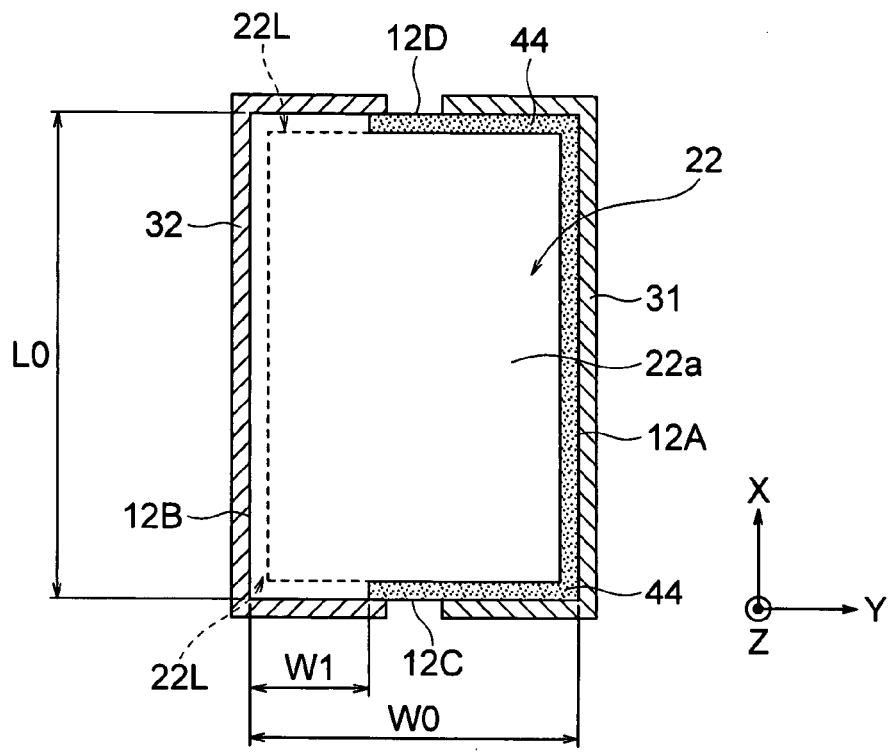

FIG. 3A and FIG. 3B are plane views wherein the first internal conductor layer 21 and the second internal conductor layer 22 both shown in FIG. 2 are observed from stacking direction Z. As shown in FIG. 3A and FIG. 3B, the first internal conductor layer 21 and the second internal conductor layer 22 thinly extend toward to a longitudinal direction X of the dielectric body 12.

The internal conductor layer 21 of FIG. 3A has a shape corresponding to an external shape of the dielectric layer 12a, and a main body portion 21a spaced with predetermined insulating space pattern 43 from circumference end portion of the dielectric layer 12a. The main body portion 21a of the internal conductor layer is a part of composing one of electrodes of a capacitor. The internal conductor layer 21 is formed on the same plane with the main body portion 21a integrally, and further comprises a first lead portion 21L led out straddling three adjacent side faces of the dielectric body 12 each other (the first longitudinal direction side face 12A, the third lateral direction side face 12C, the fourth lateral direction side face 12D). In the first lead portion 21L, the first internal conductor layer 21 and the first terminal electrode 31 are connected.

The internal conductor layer 22 of FIG. 3B has a shape corresponding to an external shape of the dielectric layer 12a, and a main body portion 22a spaced with predetermined insulating space pattern 44 from circumference end portion of the dielectric layer 12a. The main body portion 22a of the internal conductor layer is a part of composing the other electrode of the capacitor. The internal conductor layer 22 is formed on the same plane with the main body portion 22a integrally, and comprises a second lead portion led out straddling three adjacent side faces of the dielectric body 12 each other (the second longitudinal direction side face 12B, the third lateral direction side face 12C, and the fourth lateral direction side face 12D). In the second lead portion 22L, the second internal conductor layer 22 and the second terminal electrode 32 are connected.

Figure 4:
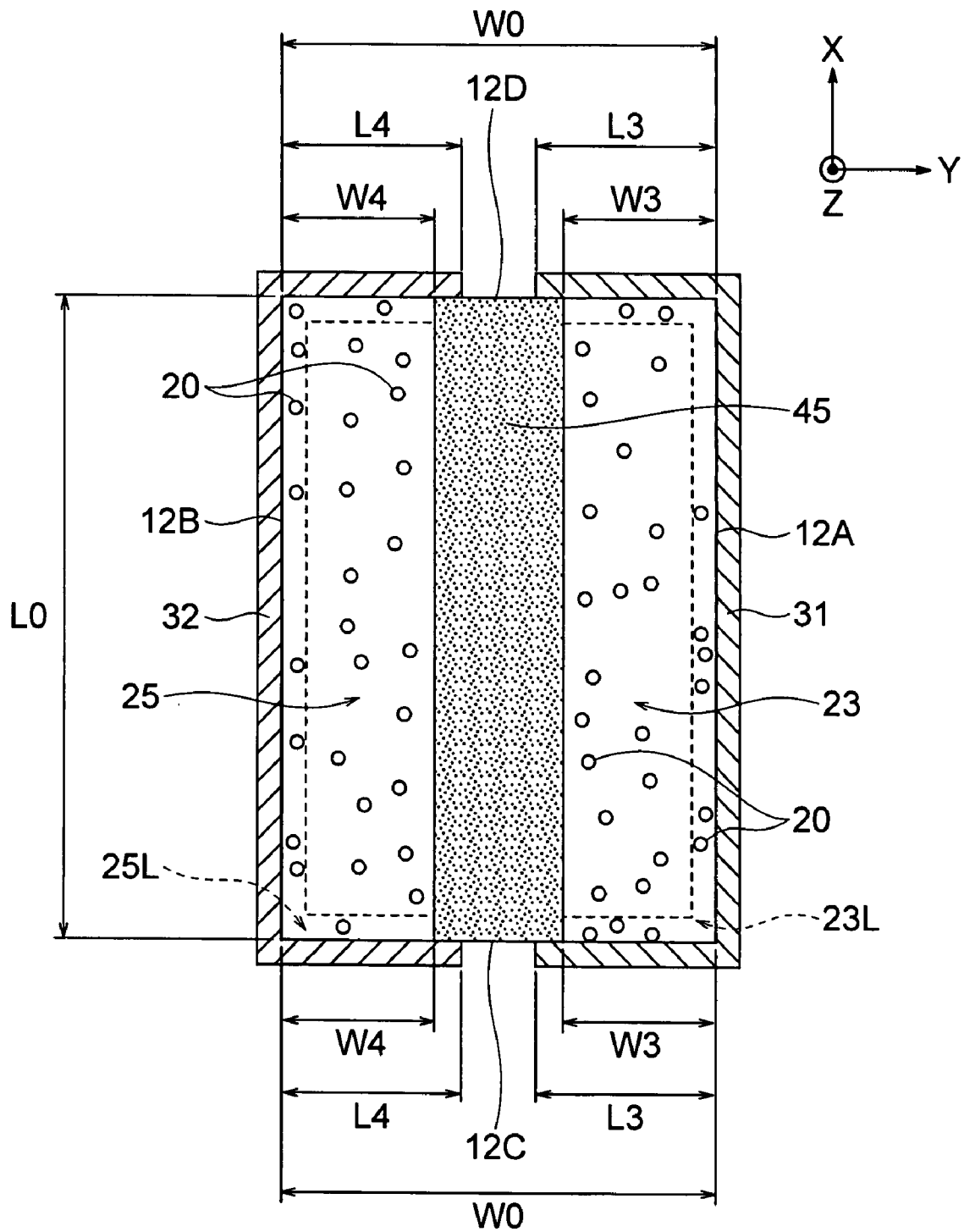
FIG. 4 is a plane view of a first external conductor layer and a second external conductor layer shown in FIG. 2.

FIG. 4 is a plane view wherein the first external conductor layer 23 and the second external conductor layer 25 shown in FIG. 2, observed from stacking direction Z. As shown in FIG. 4, the first external conductor layer 23 and the second external conductor layer 25 thinly extend toward to a longitudinal direction X of the dielectric body 12. Note that, in the present embodiment, as shown in FIG. 4, the external conductor layer 23 and the second external conductor layer 25 are arranged on an identical plane which is vertical to stacking direction Z, in a manner sandwiching the insulating space pattern 45. Therefore, the first external conductor layer 23 and the second external conductor layer 25 arranged on the identical plane are not electrically connected.

Note that the first external conductor layer 23 and the second external conductor layer 25 are not necessarily arranged on an identical plane as far as not overlapping in stacking direction Z each other.

The first external conductor layer 23 comprises a third lead portion 23L which is integrally formed with the first external conductor layer 23 on an identical plane and led out straddling three adjacent side faces of the dielectric body 12 each other (the first longitudinal direction side face 12A, the third lateral direction side face 12C and the fourth lateral direction side face 12D). In the third lead portion 23L, the first external conductor layer 23 is connected to the first terminal electrode 31.

The second external conductor layer 25 comprises a fourth lead portion 25L which is integrally formed with the second external conductor layer 25 on an identical plane and led out straddling three adjacent side faces of the dielectric body 12 each other (the second longitudinal direction side face 12B, the third lateral direction side face 12C and the fourth lateral direction side face 12D). In the fourth lead portion 25L, the second external conductor layer 25 is connected to the second terminal electrode 32.

As shown in FIG. 4, in the first external conductor layer 23 and the second external conductor layer 25, a plurality of pin hole conducing portions 20 are connected in an area where these conductor layers and the adjacent dielectric layer 12a are overlapped.

Preferably, a pin hole diameter of said pin hole conducting portion 20 is 1 to 10 μm. Also, preferably, the pin hole diameter of said pin hole conducting portions is larger than a particle diameter of conducting material (metallic particle) filled in the pin hole in order to make the pin hole conducting portion 20.

By making pin hole diameter within a range of 1 to 10 μm, in forming process of the pin hole conducting portions, it is possible to fill conducting material into the pin hole, sufficiently and precisely. As a result, the pin hole conducting portions 20 penetrate the dielectric layer 12a completely. Therefore, a pair of first external conductor layers 23 each other or a pair of second external conductor layers 25 each other adjacent to the dielectric layer 12a can be connected electrically, so that it is possible to separate the current sufficiently. As a result, the ESL of whole multilayer capacitor 10 can be reduced.

Preferably, a total crossing area of said pin hole conducting portions 20 is 30 to 50% to an area of the first external conductor layer 23 or the second external conductor layer 25 connected by the pin hole conducting portions 20. Note that the total crossing area of pin hole conducting portions 20 means total value of an area of a plurality of pin hole conducting portions 20 (area of XY-plane direction vertical to stacking direction Z) formed on one dielectric layer 12a.

By making a total crossing area of the pin hole conducting portions 20 (current flow channel crossing area) within the above range, the current is sufficiently separated between the first external conductor layers 23 or the second external conductor layers 25, and thus, the ESL of whole multilayer capacitor 10 can be reduced sufficiently. Also, strength of an external layer green sheet forming the dielectric layer 12a of the external layer portion 19b can be sufficient.

Preferably, a plurality of pin hole conducting portions 20 are randomly arranged in stacking direction Z and a vertical plane direction XY to stacking direction of the dielectric layer 12a having a plurality of the pin hole conducting portions 20.

By randomly arranging an infinite number of the pin hole conducting portions 20 in the dielectric layer 12, it is possible to make a broad array and to vary directions of the current between the external conductor layers. This function and effect cannot be obtained by through hole conducting portion and the like having larger size than that of pin hole conducting portion and limited number of through holes (hole diameter is about 50 μm). Also, in the dielectric layer 12a, by randomly arranging an infinite number of the pin hole conducting portions 20, it is possible to increase adhesion strength of the dielectric layer 12a, the first and the second external conductor layers 23, 25 adjacent to the dielectric layer 12a.

Preferably, as shown in FIG. 4, when a width of the third lead portion 23L in lateral direction, a width of the fourth lead portion 25L, a width of the first terminal electrode 31 and a width of the second terminal electrode 32 is W3, W4, L3 and L4, respectively, W3<L3, and W4<L4.

By making W3<L3 and W4<L4, it is possible to prevent exposure of the first external conductor layer 23 and the second external conductor layer 25 on the third lateral direction side face 12C and the fourth lateral direction side face 12D.

Preferably, a width of the third direction side face 12C and a width of the fourth lateral direction side face 12D in lateral direction Y, are W0, $0.15 \leq W3/W0 \leq 0.45$, and $0.15 \leq W4/W0 \leq 0.45$.

When W3/W0 and W4/W0 are too small, the effect of reducing the ESL of capacitor cannot be obtained sufficiently because the spread current flow from each terminal electrode to each external conductor layer becomes smaller. Also, when W3/W0 and W4/W0 are too large, there is a possibility that each external conductor layers are exposed on the side faces of the dielectric body 12 or that the opposing first and second external conducting layers 23 and 25 contact each other. Consequently, by making W3/W0 and W4/W0 within the above range in order to prevent these defects, the ESL of capacitor can be reduced.

Next, function of the multilayer capacitor 10 according to the present embodiment will be explained.

In the multilayer capacitor 10, as shown in FIG. 2, at external layer portions 19a and 19b, the first external conductor layer 23 and the second external conductor layer 25 are stacked via dielectric layer 12a so as not to overlap each other in stacking direction Z. Also, the first external conductor layer 23 and the second external conductor layer 25 are not electrically connected. Therefore, the first external conductor layer 23 and the second external conductor layer 25 are dummy electrodes having no function of an internal electrode (storage function) in a capacitor.

Here, for instance, in case that electric-potential of the first terminal electrode 31 is higher than that of the second terminal electrode 32, the electric current spreads from the first terminal electrode 31 to the first external conductor layer 23. Simultaneously, the electric current flows from the second external conductor layer 25 into the second terminal electrode 32. On the other hand, in case that electric-potential of the second terminal electrode 32 is higher than that of the first terminal electrode 31, the electric current spreads from the second terminal electrode 32 to the second external conductor layer 25. Simultaneously, the electric current flows from the first external conductor layer 23 into the first terminal electrode 31.

In the multilayer capacitor 10 of the present embodiment, in any cases of both stated above, as a result of the electric current to spread flow from terminal electrodes to each of external conductor layers which are dummy electrodes, the ESL of whole multilayer capacitor 10 can be reduced.

Further, in the multilayer capacitor 10, the first terminal electrode 31 is formed straddling the following three side faces: the first longitudinal direction side face 12A, the third lateral direction side face 12C and the fourth lateral direction side face 12D. Similarly, the second terminal electrode 32 is formed straddling the following three side faces: the second longitudinal direction side face 12B, the third lateral direction side face 12C and the fourth lateral direction side face 12D. In this manner, by connecting respective terminal electrode formed straddling three side faces of the dielectric body 12 with respective external conductor layers, the current flow channel crossing area between each terminal electrode and each conductor layer becomes larger. As a result, the ESL of whole multilayer capacitor 10 can be reduced.

Also, the dielectric layer 12 positioned at the external layer portion 19b comprises a plurality of pin hole conducting portions 20 electrically to connect a pair of the first external conductor layers 23 or a pair of the second external conductor layers 25 adjacent to the dielectric layer 12a in stacking direction Z. As a result, through pin hole conducting portions 20, in between a pair of the first external conductor layers 23 or a pair of the second external conductor layers 25, the current spreads variously in stacking direction Z. As a result, the ESL of whole multilayer capacitor 10 can be reduced further.

Figure 5:
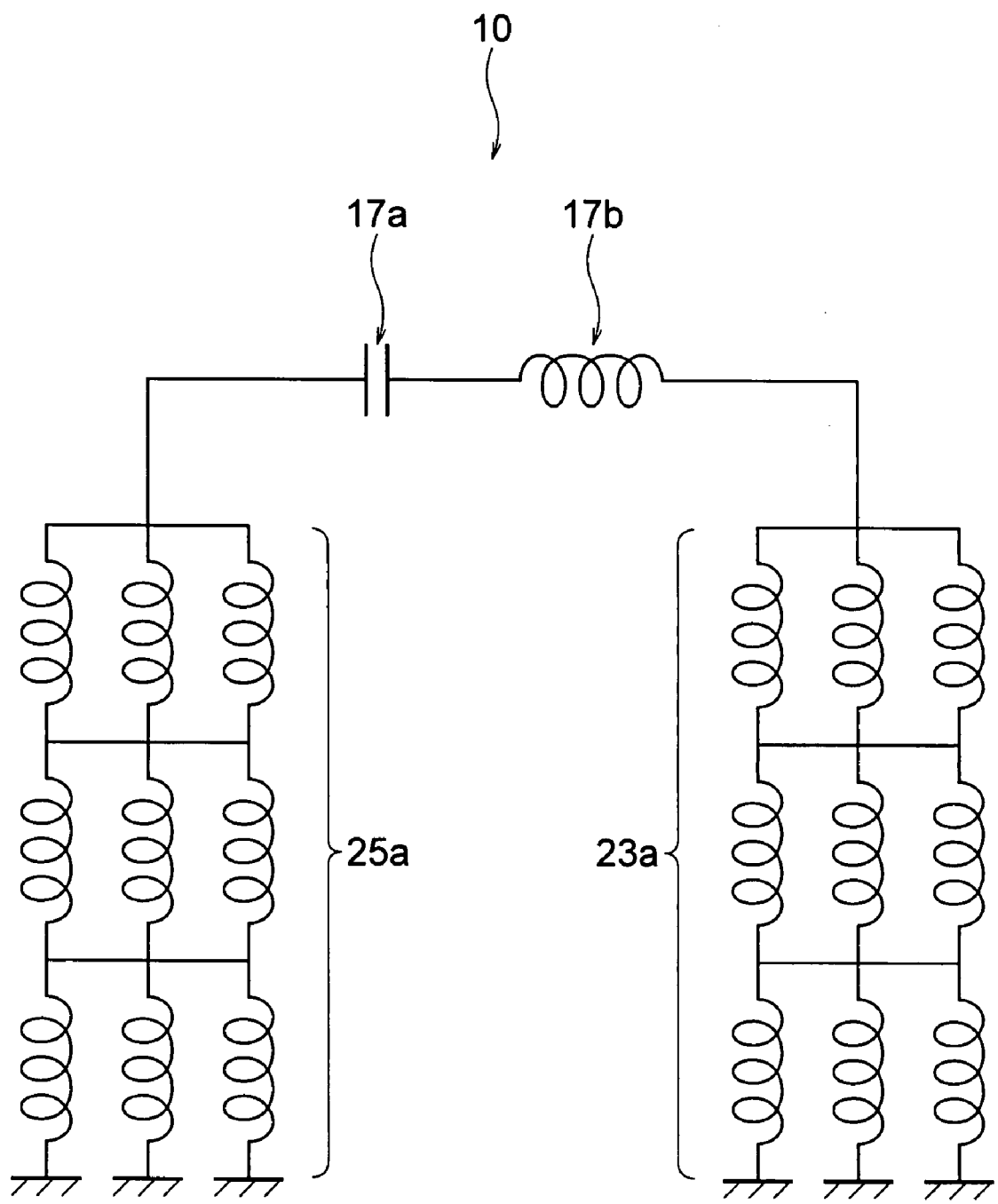
FIG. 5 is a circuit diagram showing functions of a first and a second internal conductor layers of an internal layer portion, a first and a second external conductor layers of an external layer portion, and pin hole conducting portions of the multilayer capacitor of the first embodiment of the present invention.

FIG. 5 is a circuit diagram of respective functions of the first and the second internal conductor layers 21 and 22 of the internal layer portions 17, the first and the second external conductor layers 23 and 25 of the external layers 19b, and pin hole conducting portions 20 as stated above. As shown in FIG. 5, the internal layer portion 17 shown in FIG. 2 is illustrated by a capacitor circuit 17a and an inductance component 17b included in the capacitor circuit 17a itself. Also, three of the first external conductor layers 23 in the external layer portions 19b shown in FIG. 2, are shown as a plurality of a first inductor components 23a connected in parallel shown in FIG. 5. Similarly, three of the second external conductor layers 25 in the external layer portion 19b are shown as a plurality of a second inductor components 25a connected in parallel shown in FIG. 5.

By connecting the first terminal electrode 31 with the first inductor components 23a, the inductance of the whole first terminal electrode can be reduced. Similarly, by connecting the second terminal electrode 32 with the second inductor components 25a, the inductance of the whole second terminal electrode can be reduced. By reducing the inductance of whole terminal electrodes included in the first and the second terminal electrodes 31 and 32, the ESL of whole multilayer capacitor 10 can be reduced.

Further, a plurality of the first external conductor layers 23 corresponding to the first inductor components 23a are connected each other by a plurality of the pin hole conducting portions 20. Also, a plurality of the second external conductor layers 25 corresponding to the second inductor components 25a are connected each other by a plurality of the pin hole conducting portions 20. As a result, the current can be spread between whole first external conductor layers 23 or whole second external conductor layers 25, through the pin hole conducting portions 20. Accordingly, the inductance of whole terminal electrode comprised in the first and the second terminal electrodes 31 and 32 can be reduced and the ESL of whole multilayer capacitor 10 can be reduced further.

Note that, in the two external layer portions 19a and 19b shown in FIG. 2, the current does not flow in the external layer portion 19a positioned on an opposite side of a circuit substrate 15 in a manner sandwiching the internal layer portion 17. Therefore, the external layer portion 19a is not indispensable because it does not contribute the ESL reduction.

In the present embodiment, in the external layer portions 19a and 19b, the first external conductor layer 23 and the second external conductor layer 25 are stacked via the dielectric layer 12a so as not to overlap each other in stacking direction Z. Therefore, the current spreads from the first terminal electrode 31 to the first external conductor layer 23, and the current flows from the second external conductor layer 25 to the second terminal electrode 32. Alternatively, the current spreads from the second terminal electrode 32 to the second external conductor layer 25, and the current flows from the first external conductor layer 23 to the first terminal electrode 31. In this manner, by spreading the electrode from terminal electrode to the respective external conductor layers, the ESL of whole multilayer capacitor can be reduced.

In the present embodiment, the dielectric layer 12a positioned on the external layer 12b comprises a plurality of the pin hole conducting portions 20 to connect a pair of the first external conductor layers 23 each other or a pair of the second external conductor layers 25 adjacent to the dielectric layer 12a, in stacking direction Z. As a result, via the pin hole conducting portions 20, the current can widely be spread in stacking direction Z, between a pair of the first external conductor layers 23 or a pair of the second external conductor layers 25. Further, the current can be widely spread between whole first external conductor layers 23 or whole second external conductor layers 25 positioned on the external layer portion 19b. As a result, the ESL of whole multilayer capacitor 10 can be further reduced.

In the present embodiment, the first terminal electrode 31 is formed straddling three side faces, the first longitudinal direction side face 12A, the third lateral direction side face 12C and the fourth lateral direction side face 12D, and the second terminal electrode 32 is formed straddling the second longitudinal direction side face 12B, the third lateral direction side face 12C and the fourth lateral direction side face 12D. In this manner, by connecting each terminal electrode formed straddling three side faces of the dielectric body 12 to each external conductor layer, a current flow channel crossing area between each terminal electrode and each external conductor layer becomes larger. As a result, the ESL of whole multilayer capacitor 10 can be reduced.

In this manner, according to the multilayer capacitor 10 of the present embodiment, a great reduction in the ESL of the multilayer capacitor 10 is achieved, fluctuation of the power source voltage can be suppressed, and the capacitor can be suitably used as a decoupling capacitor, etc.

(Manufacturing Method of Multilayer Capacitor)

Next, a manufacturing method of the multilayer capacitor 10 according to the first embodiment will be explained. Note that manufacturing methods for the multilayer capacitor 10 according to the present embodiment are not limited to the following method.

Forming Internal Layer Green Sheet

Firstly, slurry for green sheet is applied to a surface of supporting sheet to form an internal layer green sheet. The internal layer green sheet will be the dielectric layer 12a in the internal layer portion 17 in the multilayer capacitor 10 (FIG. 2), after completed.

Forming method of internal layer green sheet is not particularly limited if layers are uniformly formed. A doctor blade method, a nozzle coating method, etc. are exemplified. Note that a formed green sheet is dried, if necessary.

Slurry for green sheet includes, as main components, ceramic powder such as calcium titanate, strontium titanate, and barium titanate. Further, as subcomponents, alkaline earth metal, transitional metal, rare-earth element, glass composition, etc. are included in the green sheet slurry. These ceramic powder and the subcomponents are mixed with solvent, dispersant, plasticizer, binder, etc. Then, dispersed processing is performed to obtain slurry for internal layer green sheet.

A solvent is not particularly limited, and glycols, alcohol, ketones, esters, aromatic series, etc. are exemplified. Specifically, terpineol, alcohol, butyl carbitol, acetone, methyl ethyl ketone (MEK), toluene, xylene, acetic ether, butyl stearate, isobornyl acetate, etc. are used.

A dispersant is not particularly limited, and maleic acid based dispersant, polyethylene glycol based dispersant, allyl ether copolymer dispersant are exemplified.

A plasticizer is not particularly limited, and phthalic acid ester, adipic acid, phosphoric ester, glycols, etc. are exemplified.

A binder is not particularly limited, and acrylic resin, butyral based resin such as polyvinyl butyral, polyvinyl acetal, polyvinyl alcohol, polyolefine, polyurethane, polystyrene, or organic compounds or emulsion composed of copolymer thereof are exemplified.

A supporting sheet material is not particularly limited as far as having an appropriate flexibility at peeling and rigidity of the support medium. Normally, polyester film, etc. such as polyethylene terephthalate (PET) is used.

Forming External Layer Green Sheet and Pin Hole

Next, slurry for green sheet is applied to a surface of supporting sheet to form an external layer green sheet. The external layer green sheet will be the dielectric layer 12a in the external layer portion 19b in the multilayer capacitor 10, after completed.

Types of raw material for forming the external layer green sheets are substantially the same in case of the above described internal layer green sheet. Therefore, in the following, only differences in forming methods for the external layer green sheet and the internal layer green sheet will be explained, and explanation of common points thereof are omitted.

In the external layer green sheet, pin holes are formed in order to form the pin hole conducting portions 20 in a post-process.

As a forming method for the pin hole, it is not particularly limited, and following methods are exemplified.

For example, as a main component of slurry for the green sheet, ceramic powders having rough shape and large particle diameter (calcium titanate, strontium titanate, barium titanate, etc.) are used compared with the case of the internal green sheet. As a result, micro-spaces, i.e., pin holes, are formed between the ceramic powders included in the green sheet.

Alternatively, by adjusting compositions and contents of binder, solvent, etc. included in the green sheet slurry, it is possible to form defect (holes) intentionally in the green sheet. The defect acts as pin holes.

Alternatively, comparing with the internal layer green sheet, the thickness of the external layer green sheet can be thin. By making the external layer thinner, the defect is formed intentionally on the green sheet. The defect acts as pin holes.

Preferably, a pin hole diameter formed on the external layer green sheet is 1 to 10 μm. Also preferably, said pin hole diameter is larger than particle diameter of conducting materials (metallic particle) filled into the pin holes in order to form pin hole conducting portions.

In the present embodiment, by making the pin hole diameter within a range of 1 to 10 μm, the above problems are prevented and the ESL of whole multilayer capacitor 10 can be reduced.

Forming Internal Dielectric Layer

Next, internal layer electrode paste is applied in a predetermined pattern on the surface of the internal layer green sheet to form the first internal conductor layer 21 (FIG. 3A) before firing and the second internal conductor layer 22 (FIG. 3B) before firing.

Forming method for each internal conductor layer is not particularly limited as far as it is a method capable to form the layer uniformly. For example, a thickness film forming method using the internal layer electrode paste such as a screen printing method or gravure printing method, or thin film forming method such as vapor deposition and sputtering are exemplified. Note that the internal conductor layer after forming is dried if necessary.

The internal layer electrode paste can be obtained by kneading conducting material, solvent, dispersant, plasticiser, binder, additive powder, etc. using a ball mill, etc. so as to slurry.

A conductive material is not particularly limited, and normally, Cu, Cu alloy, Ni or Ni alloy, etc., Ag, Ag—Pd alloy, In—Ga alloy, etc. are used.

A solvent is not particularly limited, and terpineol, butylcarbitol, kerosene, acetone, isobornyl acetate, etc. are exemplified.

A dispersant is not particularly limited, and maleic acid based dispersant, polyethylene glycol based dispersant and allyl ether copolymer dispersant are exemplified.

A plasticizer is not particularly limited, and phthalic acid ester, adipic acid, phosphoric ester, glycols, etc. are exemplified.

A binder is not particularly limited, and acrylic resin, polyvinyl butyral resin, polyvinyl acetal resin, ethyl cellulose, etc. are exemplified.

As additive powder, co-material having same composition of ceramic powder included in the green sheet can be used. The co-material inhibits the sintering of the conductor material during firing process.

Forming External Conductor Layer and Pin Hole Conducting Portion

Next, external layer electrode paste is applied in a predetermined pattern on the surface of the external layer green sheet to form the first external conductor layer 23 (FIG. 4) and the second external conductor layer 25 (FIG. 4). In the following, differences in forming methods for the external conductor layer and the internal conductor layer will be only explained, and other explanation are omitted.

Forming method for each external conductor layer is not particularly limited as far as it is a method capable to form layers uniformly. Preferably, a screen printing method or gravure printing using external electrode paste is used.

By applying the external layer electrode paste including conductive material to the external layer green sheet having pin holes by printing, the first external conductor layer 23 and the second external conductor layer 25 are formed. Simultaneously, the pin holes are filled by the external layer electrode paste (conductive material), so that the pin hole conducting portions are formed. Namely, in the manufacturing method according to the present embodiment, forming the first external conductor layer 23 and the second external conductor layer 25, and forming the pin hole conducting portions 20 can be conducted simultaneously.

Preferably, a particle diameter of the conducting material (metallic particle) included in the external layer electrode paste is smaller than a pin hole diameter. By making the particle diameter of the conducting material smaller than the pin hole diameter, the pin holes are closely filled to form the pin hole conducting portions 20 which completely penetrate the external layer green sheet (later dielectric layer 12*a*) can be formed.

Note that each external conductor layer after forming is dried if necessary.

Forming Blank Pattern Layer

Note that, after (or before) forming each conductor layer on the surface of each green sheet, blank pattern layer paste is applied to blank portions in which each conductor layer is not formed on the surface of each green sheet, so that a blank pattern layer is formed. As a result, gaps between each conductor layer and each green sheet can be cleared.

The blank pattern layers can be formed by similar method for each conductor layer or each green sheet. Note that the blank pattern layers after forming are dried if necessary.

As a blank pattern layer paste, normally, a paste similar to the green sheet paste is used.

Forming Stacking Layer Body

Next, the support sheet is peeled from the internal layer green sheet (hereinafter referred to as "internal layer body unit") wherein the first internal conductor layer 21 and the second internal conductor layer 22 are formed. Next, a plurality of the internal layer body units is stacked. When stacking, a plurality of the internal layer body unit are stacked in sequence so that an internal layer green sheet of one of the internal layer body unit contacts with surfaces of the first internal conductor layer 21 and the second internal conductor layer 22 of the other internal layer body unit. Further, when stacking, each of the internal layer body units is stacked so as to mutually overlap the first internal conductor layer 21 and the second internal conductor layer 22. As a result, an internal layer stacking portion can be obtained. The internal layer stacking portion becomes the internal layer portion 17 in the multilayer capacitor 10 (FIG. 2) after completed.

Next, the support sheet is peeled from the external layer green sheet (hereinafter referred to as "external layer body unit") wherein the first external conductor layer 23 and the second external conductor layer 25 are formed. Next, a plurality of the external layer body units is stacked. When stacking, a plurality of the external layer body unit is stacked in sequence so that an external layer green sheet of one of the external layer body unit contacts with surfaces of the first external conductor layer 23 and the second external conductor layer 25 of the other external layer body unit. Further, each of the external layer bodies is stacked so as not to mutually overlap the first external conductor layer 23 and the second external conductor layer 25. As a result, an external layer stacking portion can be obtained. The external layer stacking portion becomes the external layer portion 19*b* in the multilayer capacitor 10 (FIG. 2) after completed.

Further, dummy external layer stacking portions, having similar structure of the above external layer stacking portion other than having the external layer green sheets without pin hole conducting portions 20, is formed. The dummy external layer stacking portions become the external layer portion 19*a* in the multilayer capacitor 10 (FIG. 2) after completed.

Next, in the internal layer stacking portion, the external layer stacking portion and the dummy external layer stacking portion are stacked on both end faces which is vertical to stacking direction Z, followed by heating and applying pressure to form a multilayer body by.

Forming Green Chip

Next, a green chip is formed by cutting predetermined dimension of the multilayer body. Then, the obtained green chip is polished by water barrel, etc. after hardening and drying to make corner portions of the green chip round (R). The green chip after polishing is washed and dried.

Forming Dielectric Body

Next, a dielectric body 12 (FIGS. 1 and 2) is formed by performing binder removal processing, firing processing and annealing processing to the green chip.

Next, the obtained dielectric body 12 is subject to polishing process. By the polishing processing, in the first longitudinal direction end face 12A, the third lateral direction side face 12C and the fourth lateral direction side face 12D of the dielectric body 12, end portions of the first internal conductor layer 21 and the first external conductor layer 23 oxidized by firing and heat processing are removed to expose metal portions not oxidized on each side face. Similarly, by polishing processing, in the second lateral direction end face 12B, the third lateral direction end face 12C and the fourth lateral direction side face 12D of the dielectric body 12, end portions of the second internal conductor layer 22 and the second external conductor layer 25 oxidized by firing and heat processing are removed to expose metal portions not oxidized on each side face.

The dielectric body 12 after polishing is washed and dried.

Forming Terminal Electrode

Next, the first terminal electrode 31 is formed straddling the adjoining five side faces of the first longitudinal direction side face 12A, the lateral direction side faces 12C and 12D, the fifth side face 12E and the sixth side face 12F of the dielectric body 12. Also, the second terminal electrode 32 is formed straddling the adjoining five side faces of the second longitudinal direction side face 12B, the lateral direction side faces 12C and 12D, the fifth side face 12E and the sixth side face 12F of the dielectric body 12.

Normally, each of the terminal electrodes is composed of three layers, namely, foundation layer, intermediate plating layer and external plating layer.

Firstly, the foundation layer is formed on the dielectric body 12. The foundation layer is formed by applying electrode paste film (Ag, Cu, etc.) on each side face of the dielectric body 12 and performing firing process thereto.

Next, the intermediate plating layer is formed on a surface of the foundation layer formed on the dielectric layer 12. The intermediate plating layer is composed of Ni or Ni alloy films, etc., and is formed by electroless plating method.

Next, by forming the external plating layer, the multilayer capacitor 10 shown in FIGS. 1 and 2 is obtained. Note that the external plating layer is formed by electrolytic plating method and is composed of plating layer of Sn or Sn alloy.

In the manufacturing method according to the present embodiment, as mentioned above, by applying and printing the external layer electrode paste to the external layer green sheet having pin holes, the first external conductor layer 23 and the second external conductor layer 25 are formed, and simultaneously, the pin hole conducing portions 20 are formed as a result of filling the pin holes with the conductive paste.

Second Embodiment

Next, a second embodiment of the present invention will be explained. Note that, in the following, explanation of matters common in the first embodiment and the second embodiment are omitted, and only different points of both embodiments will be explained.

Figure 6A:
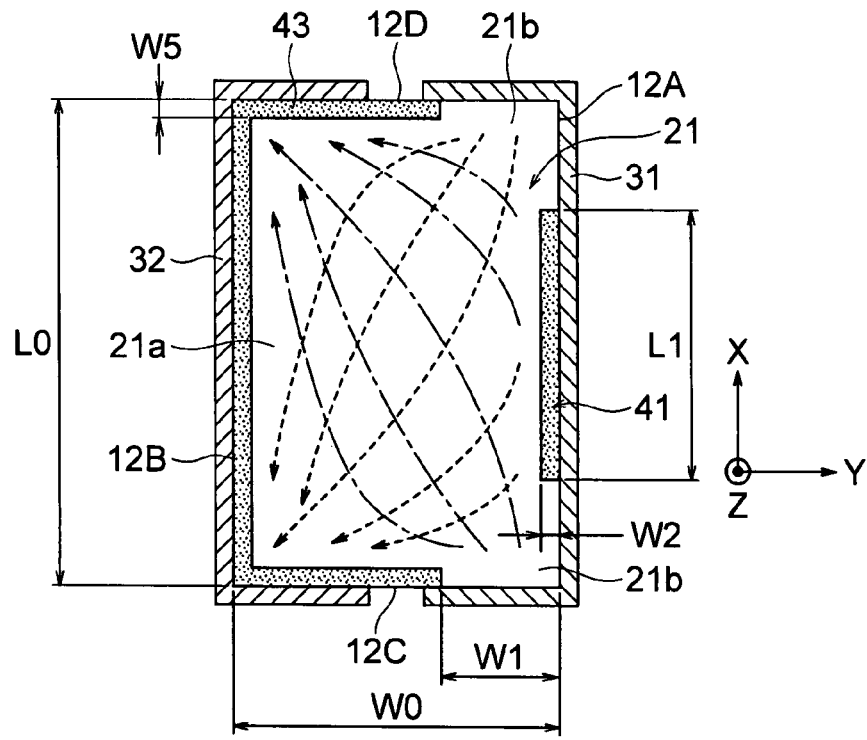
FIG. 6A and FIG. 6B are plane views of a first internal conductor layer and a second internal conductor layer of a multilayer capacitor in a second embodiment of the present invention, respectively.

As shown in FIG. 6A, in the present embodiment, in the first lead portion of the first internal conductor layer 21, the first space pattern 41 which is not connected to the first terminal electrode 31 is formed at a center position along with the first longitudinal direction side face 12A. Consequently, the first lead portion comprises a pair of branch lead patterns 21b led out from a main body 21a of the first internal conductor layer 21 to two corner portions wherein the first longitudinal direction side face 12A and the lateral side faces 12C and 12D of the dielectric body 12 are crossing.

When the width of the lateral direction Y of the dielectric body 12 is W0, the width W1 of the lateral direction Y of the branch lead pattern 21b of the first lead portion is determined so that a ratio of W1/W0 is within a range of 0.15 to 0.45, preferably, 0.25 to 0.40.

Also, when the width of the longitudinal direction X of the dielectric body 12 is L0, the width L1 of the longitudinal direction of the first space pattern 41 is determined so that a ratio of L1/L0 is within a range of 0.2 to 0.5, preferably, 0.3 to 0.45.

In the present embodiment, the first space pattern 41 is formed at a center position of a longitudinal direction X of the first longitudinal direction side face 12A of the dielectric body 12. An insulation space pattern 43 is formed continuously straddling the second longitudinal direction side face 12B, and the lateral side faces 12C and 12D of the dielectric body 12, and both end portions of the longitudinal direction of the space pattern 43 contact to the branch lead pattern 21b of the first lead portion. In the present embodiment, a plane pattern of the first internal conductor layer 21 is a line symmetrical pattern to a centerline passing through a center position of the longitudinal direction X of the dielectric body 12.

The width of a space W2 of the first space pattern 41 is comparable to the width of space W5 of the insulating space 43, and preferably, 100 to 200 μm or so. If these electrode widths W2 and W5 are too small, the insulation properties with each terminal electrode 31 or 32 is liable to be insufficient; when too large, an area of the main body portion 21a will be narrower and an ability as capacitor is liable to decline.

Figure 6B:
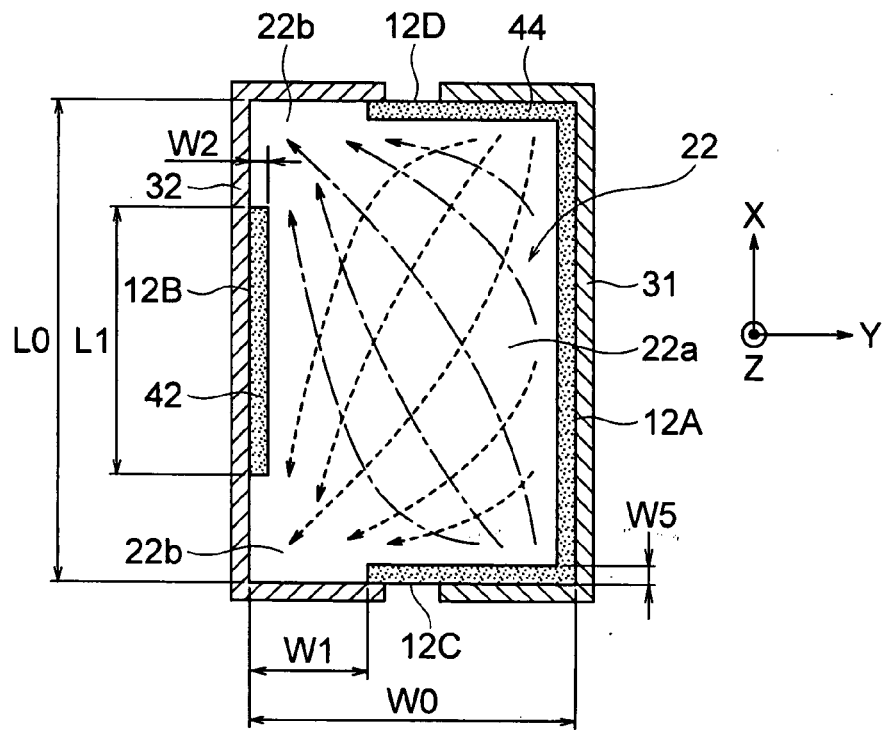

As shown in FIG. 6B, in the present embodiment, in the second lead portion of the second internal conductor layer 22, the second space pattern 42 which is not connected to the second terminal electrode 32 is formed at a center position along with the second longitudinal direction side face 12B. Consequently, the second lead portion comprises a pair of branch lead patterns 22b led out from a main body 22a of the first internal conductor layer 22 to two corner portions wherein the second longitudinal direction side face 12B and the lateral side faces 12C and 12D of the dielectric body 12 are crossing.

In this embodiment, a shape of the second internal conductor layer 22a is a pattern that the first internal conductor layer 21a is rotated 180 degrees around on a XY plane, having similar dimensions (L0, L1, W1, W0, W2 and W5).

From the above relation of the dimensions, the lead patterns 21b and 22b formed on the two types of the first and the second internal conductor layers 21 and 22 respectively are arranged in a positional relationship not overlapping when projected in stacking direction Z of the dielectric layer 12a. The respective body portions 21a and 22a are overlapping when projected in stacking direction Z of the dielectric layer 12a to compose a capacitor through the dielectric layer 12a.

Next, the effect of the multilayer capacitor 10 according to the present embodiment will be explained.

According to the multilayer capacitor 10 of the present embodiment, two types of internal conductor layers 21 and 22 are alternately arranged in a manner sandwiched between the dielectric layers in a dielectric body 12 formed into a rectangular parallelepiped shape by stacking a plurality of dielectric layers. These two types of the internal conductor layers 21 and 22 are arranged in a positional relationship not overlapping when projected in stacking direction of the dielectric layer and are led out straddling three side faces of the dielectric body 12. Further, the two type of the terminal electrodes 31 and 32 are arranged at the outside of the dielectric body 12 straddling three side faces of the dielectric body 12. These two terminal electrodes 31 and 32 are connected to either of the two types of the internal conductor layers 21 and 22.

Furthermore, in the multilayer capacitor 10 according to the present embodiment, a first space pattern 41 is formed to the first lead portion of the first internal conductor layer 21. Consequently, the first lead portion comprises a pair of branch lead patterns 21b led out from a main body to 21a of the first internal conductor layer 21 to two corner portions wherein the first longitudinal direction side face 12A and the lateral side faces 12C and 12D of the dielectric body are crossing. Consequently, in the first internal conductor layer 21, the current flows are made from corner portions of the respective branch lead pattern 21b to respective diagonal corner portions, and these flows are crossing in an identical plane at the main body 21a of the first internal conductor layer 21.

Similarly, in each of the second internal conductor layers 22, the current flow is made from corner portions of the respective branch lead pattern 22b to respective diagonal corner portions, and these flows are crossing in an identical plane at the main body 22a of the internal conductor layer 22.

As a result, an action canceling out the magnetic field rises at positions where the currents are crossing, along with this, the effects arise that the parasitic inductance of the multilayer capacitor 10 itself can be reduced and the ESL is reduced.

Further, in the present embodiment, since the first terminal electrode 31 and the second terminal electrode 32 are mutually opposed in the lateral direction Y, a distance between the terminals become shorter, so that a reduction in the ESL of the multilayer capacitor is achieved at this point as well. Further, even though forming the space patterns 41 and 42 at each lead portion in order to form the first terminal electrode 31 and the second terminal electrode 32 along with the first and the second longitudinal direction side faces 12A and 12B respectively, contact lengths of the branch lead patterns 21*b* and 22*b* of each lead portion and each of the terminal electrodes 31 and 32 can be secured sufficiently.

Further, in the present embodiment, by arranging pluralities of the two types of the first and the second internal conductor layers 21 and 22 in the dielectric body 12, not only does the electrostatic capacitance rise, but also the action canceling out the magnetic field becomes a greater, the inductance is more greatly reduced, and the ESL is further reduced.

Third Embodiment

Next, a third embodiment of the present invention will be explained based on FIG. 7A to FIG. 7D. Note that, in the following, matters common in the first, the second and the third embodiments are omitted, and only different points of the above embodiments and the third embodiment will be explained.

Figure 7A:
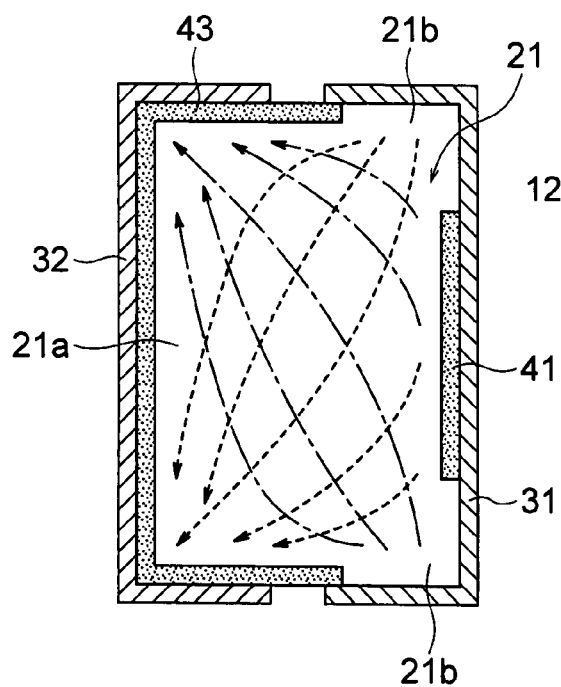
FIG. 7A to FIG. 7D are plane views of a first to a fourth internal conductor layers of a multilayer capacitor in a third embodiment of the present invention.
Figure 7B:
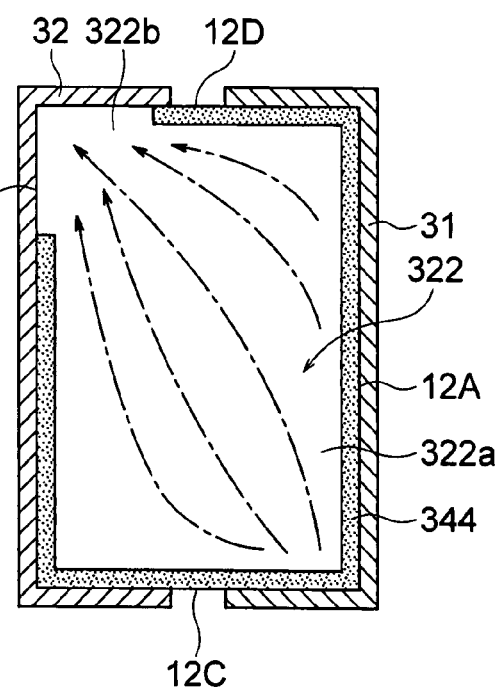
Figure 7C:
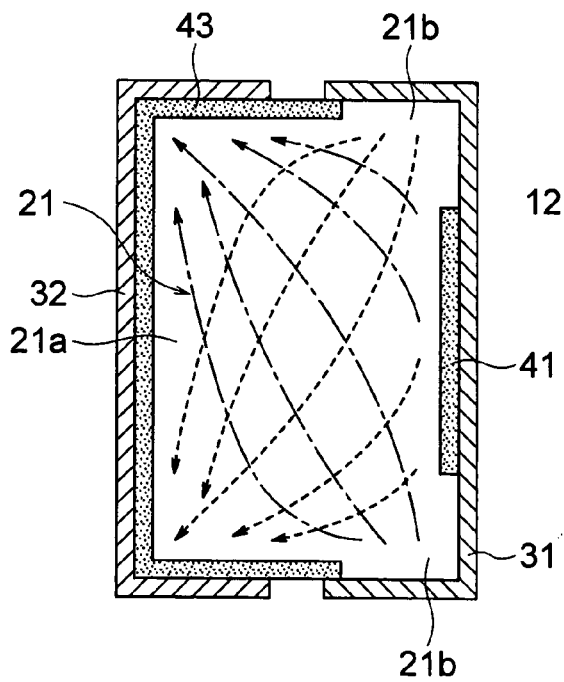
Figure 7D:
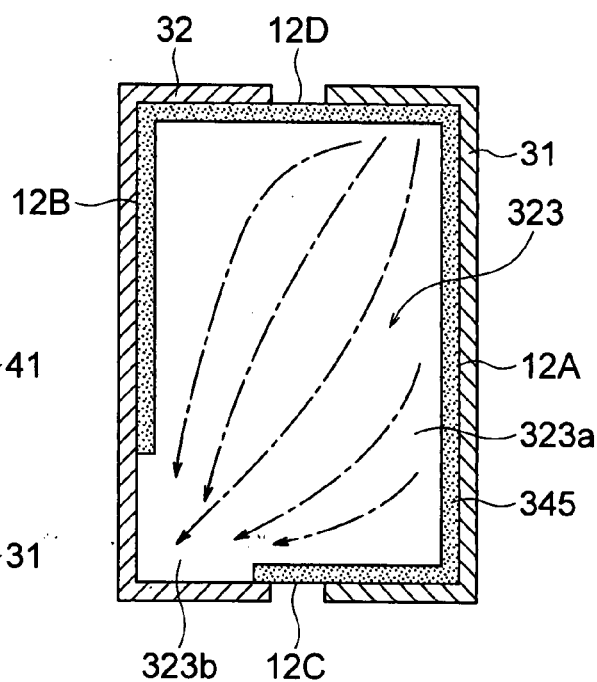

In the present embodiment, other than substituting the second internal conductor layer 22 of the second embodiment with two types of the second internal conductor layers 322 shown in FIG. 7B and FIG. 7D and the second internal conductor layers 323 shown in FIG. 7D, a multilayer capacitor is composed in the same way as in the first embodiment.

In the present embodiment, the second internal conductor layer 322 shown in FIG. 7B is stacked via the dielectric layer 12*a* under the first internal conductor layer 21 shown in FIG. 7A which is the same as that of the second embodiment, and the first conductor layer 21 shown in FIG. 7C which is the same as the second embodiment is stacked via the dielectric layer 12*a* under the second internal conductor layer 322. Then, the second internal conductor layer 323 shown in FIG. 7D is stacked via the dielectric layer 12*a* under the first conductor layer 21. Below this, it is repeated to stack the conductor layers 21, 322, 21 and 323 stated above shown in FIG. 7A to FIG. 7D.

In the present embodiment, the second internal conductor layer 322 comprises an internal conductor layer body portion 322*a* corresponding to a main body 22*a* of the second internal conductor layer according to the second embodiment, and a single lead pattern 322*b* corresponding to a branch lead pattern 22*b*. The single lead pattern 322*b* is only connected to the second terminal electrode 32 positioned at a corner portion where the second longitudinal direction side face 12B and the fourth lateral direction side face 12D are crossing.

In order to form the single lead pattern 322*b* only, an insulating space pattern 344 which is continued in the area without the lead pattern 322*b*, is formed around the internal conductor layer body portion 322*a*.

On the other hand, the second internal conductor layer 323 comprises an internal conductor layer body portion 323*a* corresponding to a main body 22*a* of the second internal conductor layer according to the second embodiment, and a single lead pattern 323*b* corresponding to a branch lead pattern 22*b*. The single lead pattern 323*b* is only connected to the second terminal electrode 32 positioned at a corner portion where the second longitudinal direction side face 12B and the third lateral direction side face 12C are crossing.

In order to form the single lead pattern 323*b* only, an insulating space pattern 345 that is continued in the area without the lead pattern 323*b*, is formed around the internal conductor layer body portion 323*a*.

In the multilayer capacitor according to the present embodiment, the cross over current similar to the second embodiment can be expected to flow in the first conductor layer 21. Further, in two types of the second internal conductor layers 322 and 323, the diagonal current flows can be realized through the respective single lead pattern 322*b* or 323*b*. In between the two types of the second internal conductor layer 322 and 323 each other, the current flows are crossing.

Accordingly, comparing with the second embodiment, although the cross over current is not formed on each identical plane of the second internal conductor layer 322 or 323, flowing of the cross over current similar to the second embodiment can be expected in the first conductor layer 21. As a result, while it is slightly inferior to the second embodiment, actions and effects almost similar to those of the second embodiment can be expected.

Fourth Embodiment

Next, a fourth embodiment of the present invention will be explained. Note that, in the following, matters common in the above embodiments are omitted, and only different points of the above embodiments and the fourth embodiment will be explained.

Figure 8:
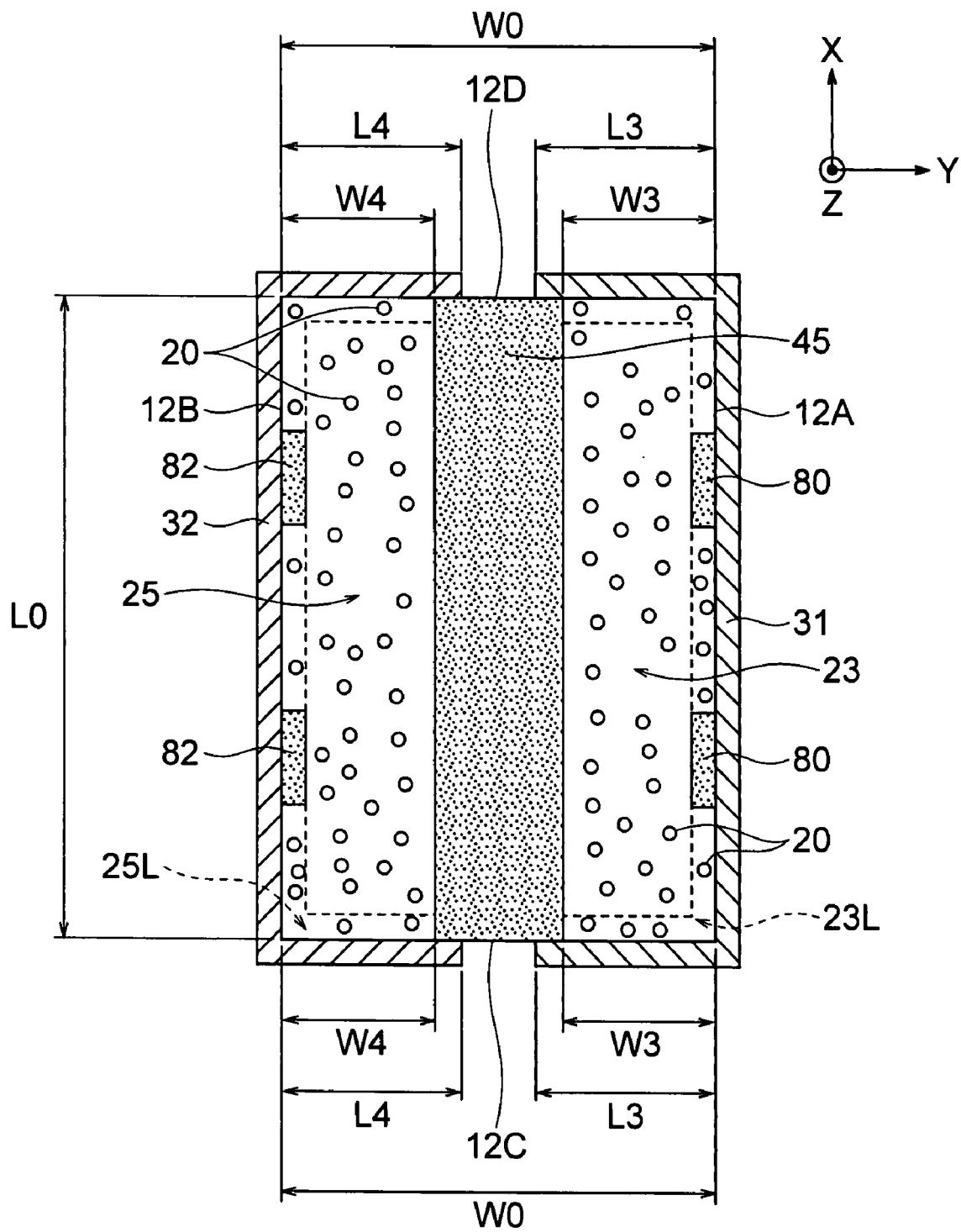
FIG. 8 is a plane view of a first and a second external conductor layers of a multilayer capacitor in a fourth embodiment of the present invention.

In the present embodiment, as shown in FIG. 8, in the first external conductor layer 23, a first external layer space pattern 80, which is not connected to the first terminal electrode 31, may be formed at a position along with the first longitudinal direction side face 12A. Further, in the second external conductor layer 25, a second external layer space pattern 82, which is not connected to the second terminal electrode 32, may be formed at a position along with the first longitudinal direction side face 12B.

In a process to form the first external conductor layer 23 and the second external conductor layer 25, normally, a cutting process for external electrode sheets wherein a large number of electrode patterns of the first external conductor layer 23 and the second external conductor layer 25 are formed translational-symmetrically will be necessary after stacking thereof via green sheet. After cutting this stacking layer, by checking whether the first external layer space pattern 80 and the second external layer space pattern 82 are arranged at a predetermined position, it is possible to confirm whether the individual first external conductor layer 23 and second external conductor layer 25 are cut out accurately, so that the misalignment of stacking can be prevented.

In such the fourth embodiment, actions and effects similar to those of the above mentioned first embodiment can be expected.

Fifth Embodiment

Next, a fifth embodiment of the present invention will be explained. Note that, in the following, matters common in the first to fourth embodiments are omitted, and only different points of the above embodiments and the fifth embodiment will be explained.

Figure 9:
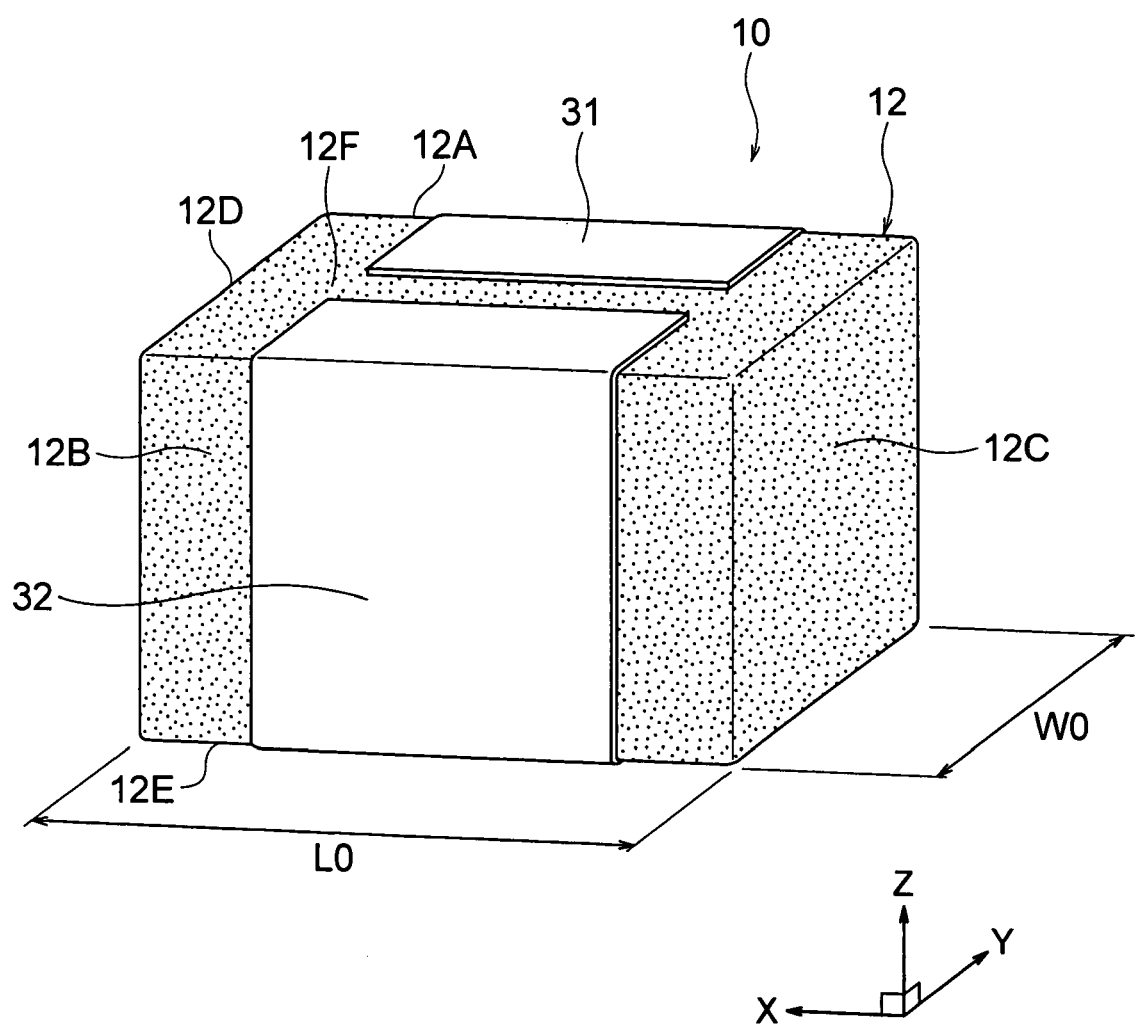
FIG. 9 is a perspective view of a multilayer capacitor in a fifth embodiment of the present invention.

In the present embodiment, as shown in FIG. 9, the first terminal electrode 31 is formed straddling three side faces: the first longitudinal direction side face 12A, the fifth side face 12E and the sixth side face 12F adjacent to the first longitudinal direction side face 12A and vertical to stacking direction Z. Further, the second terminal electrode 32 is formed straddling three side faces: the second longitudinal direction side face 12B, the fifth side face 12E and the sixth side face 12F adjacent to the second longitudinal direction side face 12B and vertical to stacking direction Z.

Figure 10A:
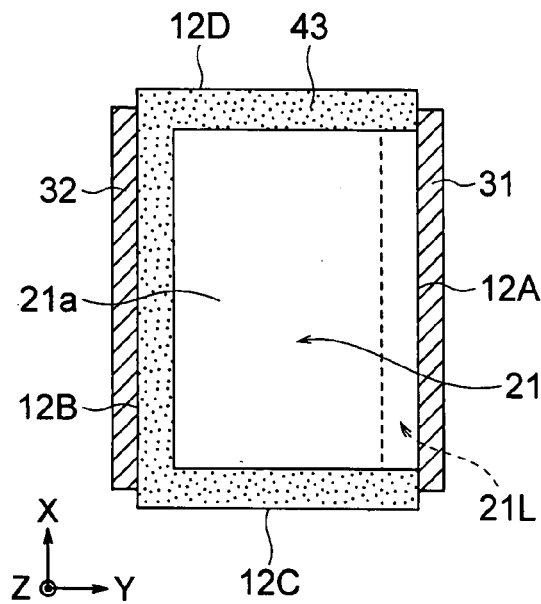
FIG. 10A and FIG. 10B are plane views of a first and a second internal conductor layers of the multilayer capacitor in the fifth embodiment of the present invention, respectively.

As shown in FIG. 10A, the first internal conductor layer 21 comprises the first internal conductor layer body portion 21a and a first lead portion 21L integrally formed on an identical plane with the body portion 21a and led out only to the first longitudinal direction side face 12A of the dielectric body 12. The first internal conductor layer 21 and the first terminal electrode 31 are connected via the first lead portion 21L, in the first longitudinal direction side face 12A.

Figure 10B:
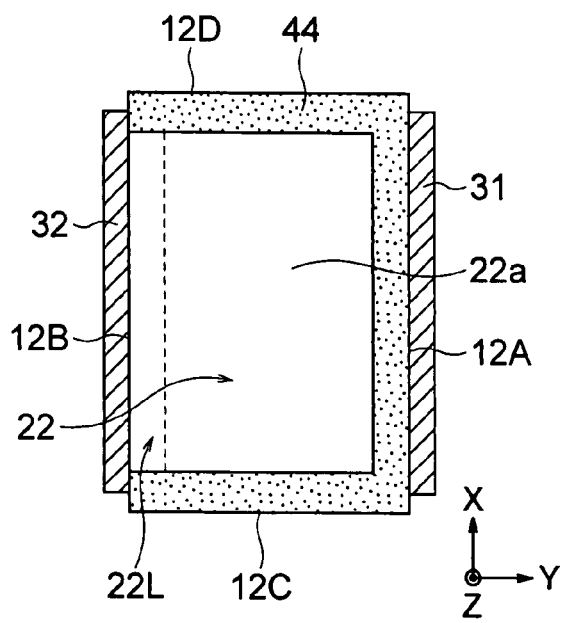

As shown in FIG. 10B, the second internal conductor layer 22 comprises the second internal conductor layer body portion 22a and a second lead portion 22L integrally formed on an identical plane with the body portion 22a and led out only to the second longitudinal direction side face 12B of the dielectric body 12. The second internal conductor layer 22 and the second terminal electrode 32 are connected via the second lead portion 22L, in the second longitudinal direction side face 12B.

Figure 10C:
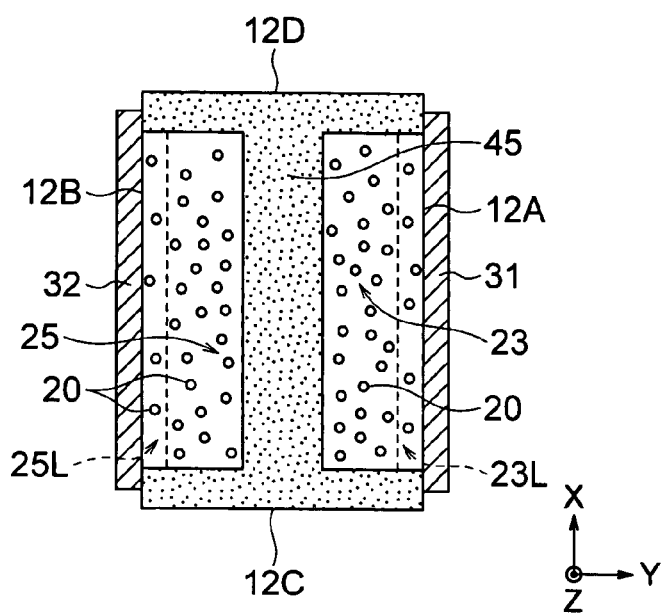
FIG. 10C is a plane view of a first and a second external conductor layers of the multilayer capacitor in the fifth embodiment of the present invention.
Figure 11A:
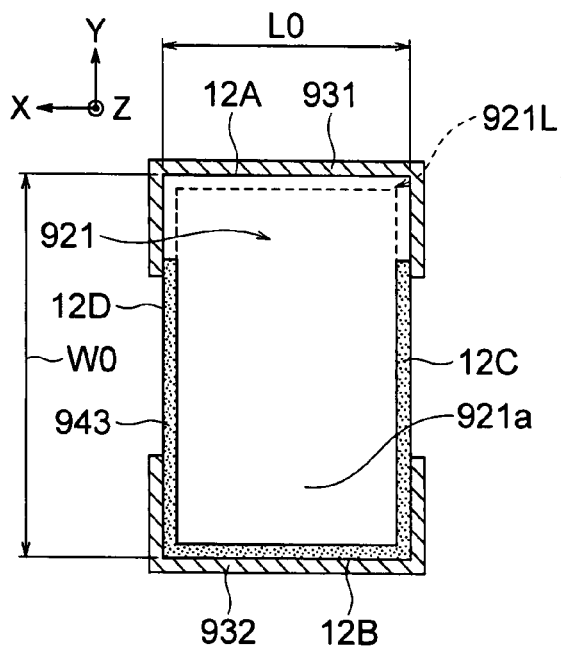
FIG. 11A and FIG. 11B are plane views of a first and a second internal conductor layers of a multilayer capacitor of a sixth embodiment of the present invention, respectively.
Figure 11B:
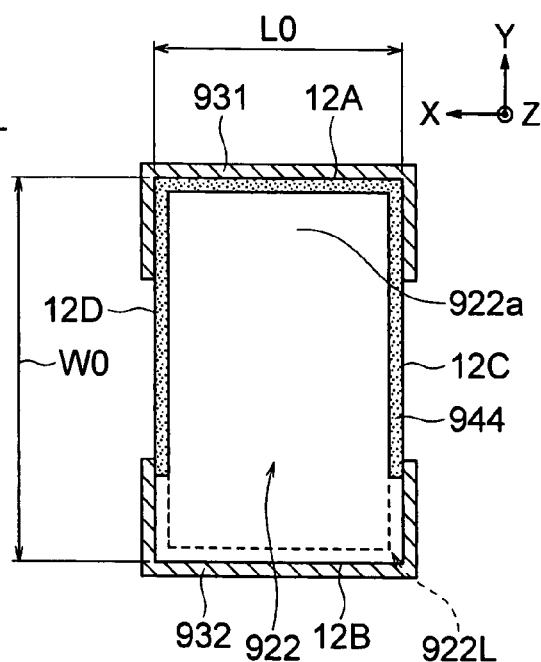
Figure 11C:
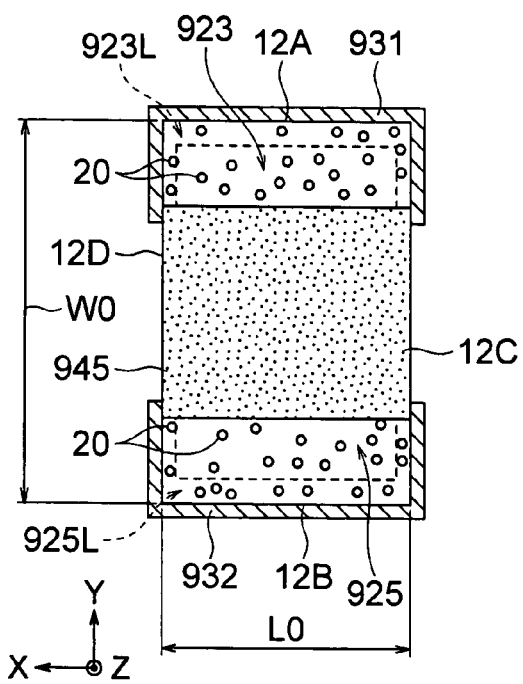
FIG. 11C and FIG. 11D are plane views of the first and the second external conductor layers of the multilayer capacitor of the sixth embodiment of the present invention, respectively.
Figure 11D:
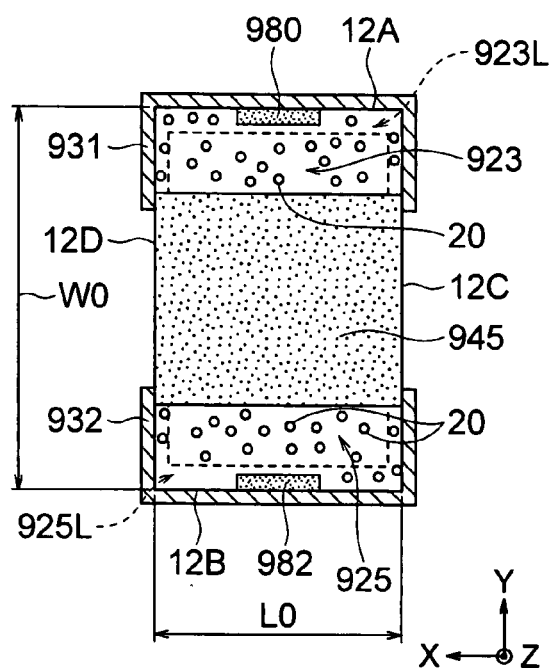

As shown in FIG. 10C, the first external conductor layer 23 comprises a third lead portion 23L integrally formed on an identical plane with the first external conductor layer 23 and led out only to the first longitudinal direction side face 12A of the dielectric body 12. The first external conductor layer 23 and the first terminal electrode 31 are connected via the third lead portion 23L, in the first longitudinal direction side face 12A.

As shown in FIG. 10C, the second external conductor layer 25 comprises a fourth lead portion 25L integrally formed on an identical plane with the second external conductor layer 25 and led out only to the second longitudinal direction side face 12B of the dielectric body 12. The second external conductor layer 25 and the second terminal electrode 32 are connected via the fourth lead portion 25L, in the second longitudinal direction side face 12B.

In such the fifth embodiment, actions and effects similar to those of the above mentioned first embodiment can be expected.

Sixth Embodiment

Next, a sixth embodiment of the present invention will be explained. Note that, in the following, matters common in the first to fifth embodiments are omitted, and only different points of the above embodiments and the sixth embodiment will be explained.

In the present embodiment, as shown in FIGS. 11A to D, widths L0 of the first side face 12A and the second side face 12B in X direction is smaller than widths W0 of the third side face 12C and the fourth side face 12D in Y direction. In this case, actions and effects similar to the first embodiment can be expected.

Note that, as shown in FIG. 1D, in a first external conductor layer 923, a first external layer space pattern 980, which is not connected to a first terminal electrode 931, may be formed at a position along with a position of the first side face 12A. Further, in a second external conductor layer 925, a second external layer space pattern 982, which is not connected to a second terminal electrode 932, may be formed at a position along with the second side face 12B.

Note that the present invention is not limited to the above embodiments and may be variously modified within the scope of the present invention.

For example, in the multilayer capacitor of the present invention, the number of stacking layers is not particularly limited, and it is possible to provide tens or hundreds of layers. Further, in the present invention, the first space pattern and the second space pattern may not necessarily continue in a longitudinal direction but may be intermittently formed.

In the above described present embodiment, as shown in FIG. 2, a dielectric body 12 comprises two external layer portions 19a and 19b. The current does not flow in the external layer portion 19a of the two external layer portions, arranged in an opposite side of a circuit substrate 15 sandwiching an internal layer portion 17. Consequently, the external layer portion 19a is not indispensable since it does not contribute the reduction of the ESL. However, as a result that the dielectric layer body 12 comprises the external layer portion 19a, the external layer portion 19a and the external layer portion 19b are symmetrically positioned sandwiching the internal layer portion 17. Namely, the dielectric body 12 may have a balanced shape. As a result, it is possible to prevent deformation of the dielectric body 12 when firing the dielectric body 12. Further, as a result that the dielectric body 12 comprises the external layer portion 19a, even when the multilayer capacitor 10 of FIG. 2 is turned into upside down to the circuit substrate 15, it is possible to perform the multilayer capacitor 10.

In the above mentioned embodiment, the external stacking layer portion and the internal stacking layer portion are formed respectively and individually, but the internal layer portion may be formed continuously after forming the external layer portion. Further, another external layer portion may be formed after forming the internal layer portion. Namely, the stacking process of the green sheets to form multilayer body may be performed by stacking each block of the external layer portion and the internal layer portion separately, and may be performed continuously without distinction thereof.

Next, the present invention will be further explained based on specific example, but the present invention is not limited to this example. In the present example, the following ESL of respective capacitor samples have been found by converting from S parameter to impedance by using impedance analyzer.

Firstly, each capacitor sample is explained. A two-terminal type multilayer capacitor according to the first embodiment as shown in FIG. 1 is a sample Ex1. Further, a capacitor formed in the same way as in the sample Ex1 other than not comprising pin hole conducting portions 20 is a sample Cex1. The ESL of each sample has been measured.

Figure 12:
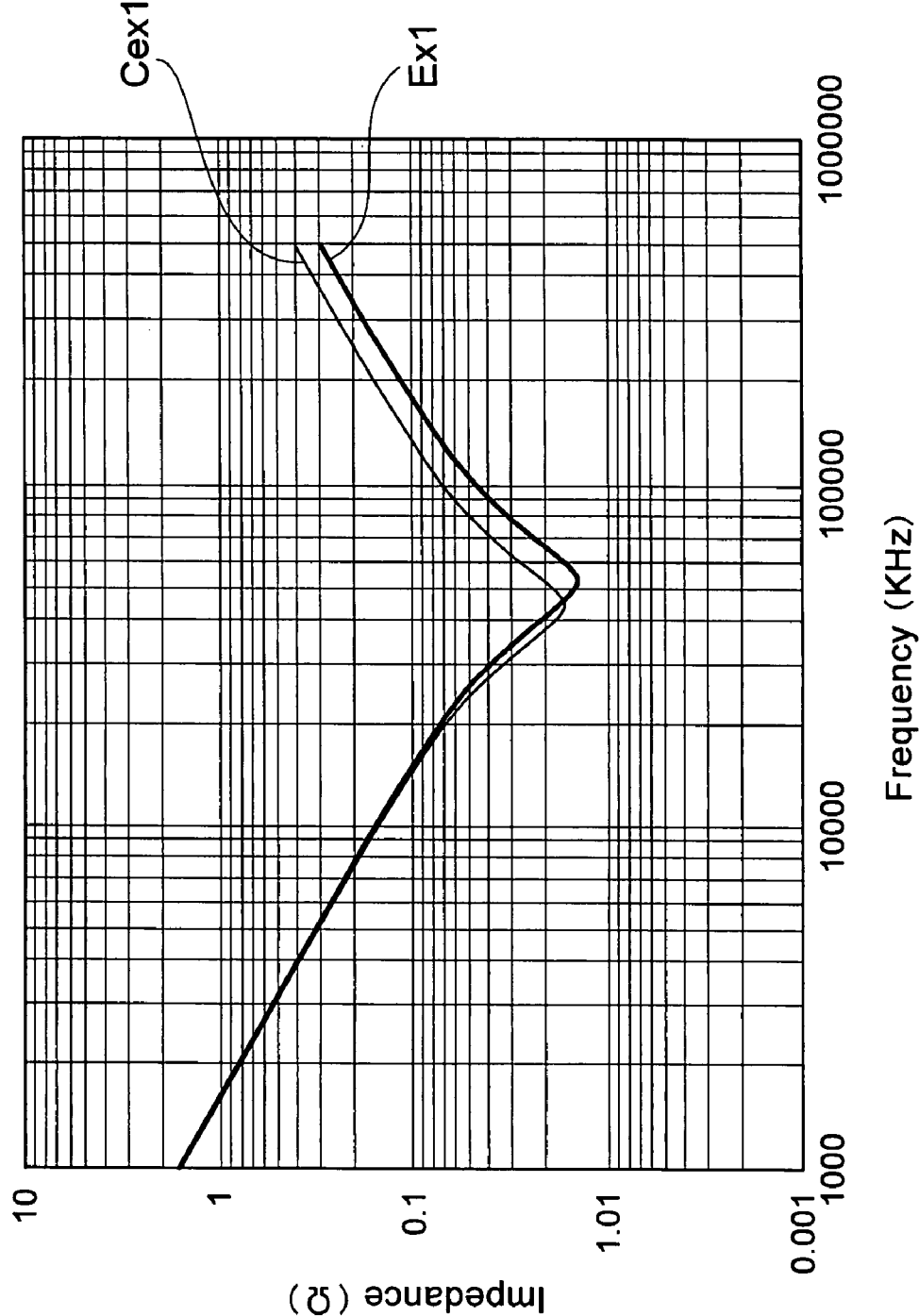
FIG. 12 is a graph of impedance characteristics of examples and comparative examples of the present invention.

As a result of this, impedance properties of each sample are measured. The results are shown in FIG. 12. As shown in a chart of FIG. 12, at a high frequency side, it was confirmed that a value of impedance of the sample Ex1 becomes smaller than that of the sample Cex1. Further, when measuring the ESL, the ESL is 98 pH in the sample Ex1, and the ESL is 122 pH in the sample Cex1. Namely, it was confirmed that the ESL is greatly reduced in the sample Ex1 according to the present embodiment of the present invention.

Note that the ESL is obtained from the following equation:

$$2\pi f_o = 1/\sqrt{(ESL \cdot C)}$$

where $f_o$ is the self resonant frequency; and C is the electrostatic capacity.

As the dimensions of the samples used here, in FIGS. 3 and 4, L0=1.6 mm, W0 is 0.8 mm, W1, W3 and W4 are 0.25 mm respectively, and W5 is 0.15 mm. The number of stacking layers of the internal conductor layer is 25 in total, and the electrostatic capacity was 0.1 μF.

The invention claimed is:

1. A multilayer capacitor comprising:
   a dielectric body formed by stacking a plurality of dielectric layers having an approximately rectangular parallelepiped shape;
   an internal layer portion in which a first internal conductor layer and a second internal conductor layer are stacked alternately in said dielectric body via said dielectric layer as mutually overlapping in stacking direction to form an internal electrode circuit of a capacitor;

an external layer portion in which pluralities of first external conductor layers and second external conductor layers, which are not overlapping in stacking direction, are stacked in said dielectric body via said dielectric layer, the external layer portions being adjacent to at least any of both end faces of said internal layer portion in stacking direction;

a first terminal electrode connected with said first internal conductor layer and said first external conductor layer, formed at least on a first side face of side faces of said dielectric body, the first side face being parallel to stacking direction; and a second terminal electrode connected with said second internal conductor layer and said second external conductor layer, formed at least on a second side face opposed to said first side face of said dielectric body, wherein;

said dielectric layer positioned at said external layer portion comprises, in an area of overlapping a pair of said first external conductor layers or a pair of said second external conductor layers adjacent to said dielectric layer, a plurality of pin hole conducting portions connecting a pair of said first external conductor layers or a pair of said second external conductor layers to each other adjacent to said dielectric layer, in stacking direction.

2. The multilayer capacitor as set forth in claim 1, wherein a pin hole diameter of said pin hole conducting portion is 1 to 10 μm, and a total crossing area of said pin hole conducting portions is 30 to 50% to an area of said first external conductor layer or said second external conductor layer connecting the pin hole conducting portions.

3. The multilayer capacitor as set forth in claim 1, wherein;

a plurality of pin hole conducting portions are randomly arranged in said stacking direction and a vertical plane direction to said stacking direction of said dielectric layer having said plurality of pin hole conducting portions.

4. The multilayer capacitor as set forth in claim 1, wherein;

said first terminal electrode is formed straddling said first side face, a third and a fourth side faces parallel to said stacking direction adjacent to said first side face of side faces of said dielectric body; and said second terminal electrode is formed straddling said second side face, said third and said fourth side faces parallel to said stacking direction adjacent to said second side face of side faces of said dielectric body.

5. The multilayer capacitor as set forth in claim 4, wherein;

said first internal conductor layer comprises a first lead portion led out straddling said first side face, said third and fourth side faces of said dielectric body, connected with said first terminal electrode; and said second internal conductor layer comprises a second lead portion led out straddling said second side face, said third and fourth side faces of said dielectric body, connected with said second terminal electrode.

6. The multilayer capacitor as set forth in claim 4, wherein;

said first external conductor layer comprises a third lead portion led out straddling said first side face, said third and fourth faces, connected with said first terminal electrode; and said second external conductor layer comprises a fourth lead portion led out straddling said second side face, said third and forth side faces, connected with said second terminal electrode.

7. The multilayer capacitor as set forth in claim 6, wherein;

when in said third and fourth side faces, a width of said third lead portion in vertical direction to said stacking direction of said dielectric layer is W3;

in said third and fourth side faces, a width of said fourth lead portion in vertical direction to said stacking direction of said dielectric layer is W4;

in said third and fourth side faces, a width of said first terminal electrode in vertical direction to said stacking direction of said dielectric layer is L3; and in said third and fourth side faces, a width of said second terminal electrode in vertical direction to said stacking direction of said dielectric layer is L4, W3<L3, and W4<L4.

8. The multilayer capacitor as set forth in claim 7, wherein $0.15 \leq W3/W0 \leq 0.45$, and $0.15 \leq W4/W0 < 0.45$ in case that a width of said third and said fourth side face in vertical direction to said stacking direction of said dielectric layer is W0.

9. The multilayer capacitor as set forth in claim 4, wherein;

width of said first and second side faces in vertical direction to said stacking direction of said dielectric layer is larger than width of said third and fourth side faces in vertical direction to said stacking direction of said dielectric layer.

10. The multilayer capacitor as set forth in claim 1, wherein;

said first terminal electrode is formed straddling said first side face, a fifth and/or sixth side faces vertical to said stacking direction adjacent to said first side face of side faces of said dielectric body; and said second terminal electrode is formed straddling said second side face, said fifth and/or said sixth side faces vertical to said stacking direction adjacent to said second side face of side faces of said dielectric body.

11. The multilayer capacitor as set forth in claim 10, wherein;

said first external conductor layer is connected with said first terminal electrode formed on said fifth side face and/or said sixth side face by a plurality of said pin hole conducting portions of said dielectric layer placed between said first terminal electrode and said first external conductor layer; and said second external conductor layer is connected with said second terminal electrode formed on said fifth side face and/or said sixth side face by a plurality of said pin hole conducting portions of said dielectric layer placed between said second terminal electrode and said second external conductor layer.

12. The multilayer capacitor as set forth in claim 10, wherein;

a width of said first terminal electrode at said fifth side face and/or said sixth side face is larger than width of said first external conductor layer in vertical direction to said stacking direction; and a width of said second terminal electrode at said fifth side face and/or said sixth side face is larger than width of said second external conductor layer in vertical direction to said stacking direction.

13. The multilayer capacitor as set forth in claim 1, wherein;

in said first internal conductor layer, a first space pattern, which is not connected with said first terminal electrode, is formed at a position along with said first side face.

14. The multilayer capacitor as set forth in claim 1, wherein;
   in said first external conductor layer, a first external layer space pattern, which is not connected with said first terminal electrode, is formed at a position along with said first side face.

15. The multilayer capacitor as set forth in claim 1, wherein;
   in said second external conductor layer, a second external layer space pattern, which is not connected with said second terminal electrode, is formed at a position along with said second side face.

16. A method for producing the multilayer capacitor as set forth in claim 1 comprising the steps of;
   forming an internal layer green sheet;
   forming said first internal conductor layer and said second internal conductor layer;
   forming an external, layer green sheet having a plurality of pin holes;
   forming pluralities of said first external conductor layer and said second external conductor layer;
   forming a plurality of said pin hole conducting portions by filling conducting material to a plurality of said pin holes;
   forming an external stacking layer portion by stacking a plurality of said first external conductor layer and said second external conductor layer via said external layer green sheet, without overlapping each other in stacking direction;
   forming an internal stacking layer portion by stacking said first internal conductor layer and said second internal conductor layer via said internal layer green sheet as mutually overlapping in said stacking direction;
   forming a green chip by cutting predetermined dimension of multilayer body having said external stacking layer portion stacked at least any one of both end faces in stacking direction of said internal layer green sheet of said internal layer stacking portion;
   forming said dielectric body by firing said green chip; and
   forming said first terminal electrode and said second terminal electrode on said dielectric body.

17. The method for producing the multilayer capacitor as set forth in claim 16 wherein said pin hole conducting portion is formed simultaneously with forming said first external conductor layer or said second external conductor layer on a surface of said external layer green sheet by stacking.

18. The method for producing the multilayer capacitor as set forth in claim 16, wherein:
   forming said internal layer portion continuously after forming said external layer portion.

19. The method for producing the multilayer capacitor as set forth in claim 16, wherein;
   forming said external layer portion continuously after forming said internal layer portion.

* * * * *